US008175096B2

(12) United States Patent
Isobe

(10) Patent No.: US 8,175,096 B2
(45) Date of Patent: May 8, 2012

(54) DEVICE FOR PROTECTION AGAINST ILLEGAL COMMUNICATIONS AND NETWORK SYSTEM THEREOF

(75) Inventor: Takashi Isobe, Machida (JP)

(73) Assignee: Hitachi, Ltd., Tokyo (JP)

( * ) Notice: Subject to any disclaimer, the term of this patent is extended or adjusted under 35 U.S.C. 154(b) by 322 days.

(21) Appl. No.: 11/657,556

(22) Filed: Jan. 25, 2007

(65) Prior Publication Data
US 2007/0201474 A1 Aug. 30, 2007

(30) Foreign Application Priority Data

Feb. 28, 2006 (JP) ................................. 2006-052181

(51) Int. Cl.
*H04L 12/56* (2006.01)
(52) U.S. Cl. ........................................ 370/392; 370/465
(58) Field of Classification Search ........................ None
See application file for complete search history.

(56) References Cited

U.S. PATENT DOCUMENTS

| | | | | | |
|---|---|---|---|---|---|
| 5,793,763 | A | * | 8/1998 | Mayes et al. | 370/389 |
| 6,101,189 | A | * | 8/2000 | Tsuruoka | 370/401 |
| 6,128,298 | A | * | 10/2000 | Wootton et al. | 370/392 |
| 6,477,595 | B1 | * | 11/2002 | Cohen et al. | 710/105 |
| 6,772,334 | B1 | * | 8/2004 | Glawitsch | 713/153 |
| 7,050,940 | B2 | * | 5/2006 | Basso et al. | 702/184 |
| 7,096,497 | B2 | * | 8/2006 | Ellison et al. | 726/22 |
| 7,483,437 | B1 | * | 1/2009 | Mohaban | 370/400 |
| 2001/0047474 | A1 | * | 11/2001 | Takagi et al. | 713/151 |
| 2006/0191003 | A1 | * | 8/2006 | Bahk et al. | 726/14 |
| 2007/0058638 | A1 | * | 3/2007 | Guichard et al. | 370/395.31 |

OTHER PUBLICATIONS

Schuba, Christoph L., et al., "Analysis of a Denial of Service Attack on TCP", IEEE, 1997, pp. 208-223.
Hedrick, C., "Routing Information Protocol", Network Working Group, Rutgers University, Jun. 1988, pp. 1-33.
Moy, J., "OSPF Version 2", Network Working Group, Proteon, Inc., Mar. 1994, pp. 1-215.
Lemon, Jonathan, "Resisting SYN flood DoS attacks with a SYN cache", FreeBSD Project, pp. 1-9.
Lemon, Jonathan, "Resisting SYN flood DoS attacks with a SYN cache", FreeBSD Project, Feb. 11-14, 2007, pp. 89-97.

* cited by examiner

*Primary Examiner* — Chirag Shah
*Assistant Examiner* — Steve Young
(74) *Attorney, Agent, or Firm* — Stites & Harbison, PLLC; Juan Carlos A. Marquez, Esq

(57) ABSTRACT

A communication device, an illegal communication protection device, and network system for providing protection from illegal communications. A communication device is connected to a network, for receiving packets sent and received over networks, and transmitting packets based on the packet destination, includes a control unit, and a storage unit for storing a routing table that stores the destination information. When there is a connection request from a packet that was received, the control unit stores the transmit source address of that packet and the line number where that packet was received, into a routing table, and where there is no connection request from the received packet, the control unit refers to the routing table, acquires the line number linked to an address matching the destination address of that packet, and sends the applicable packet via the acquired line number.

3 Claims, 24 Drawing Sheets

ROUTING TYPE REGISTER TABLE 113

NORMAL ROUTING TABLE 115

TCP ROUTING TABLE 116

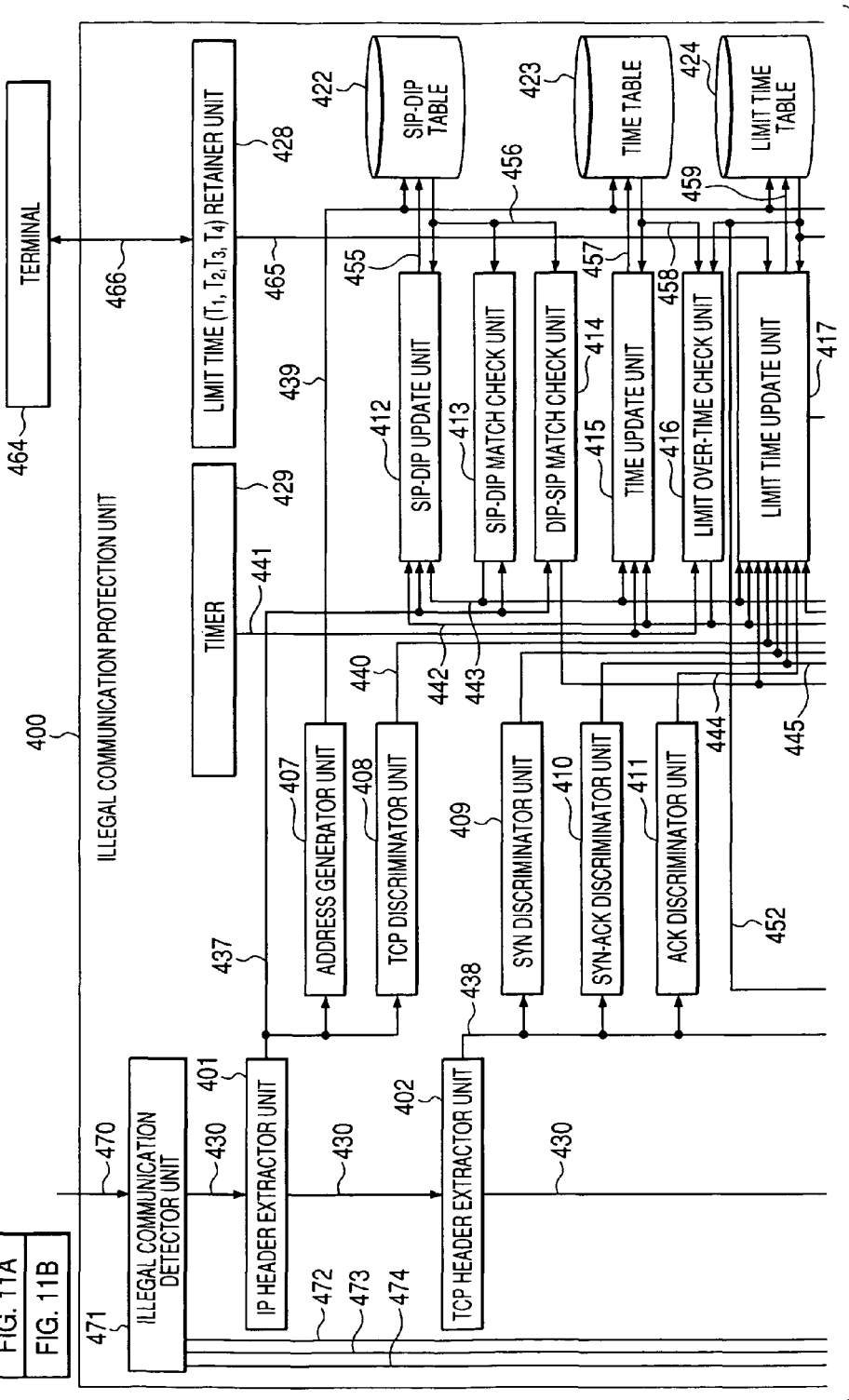

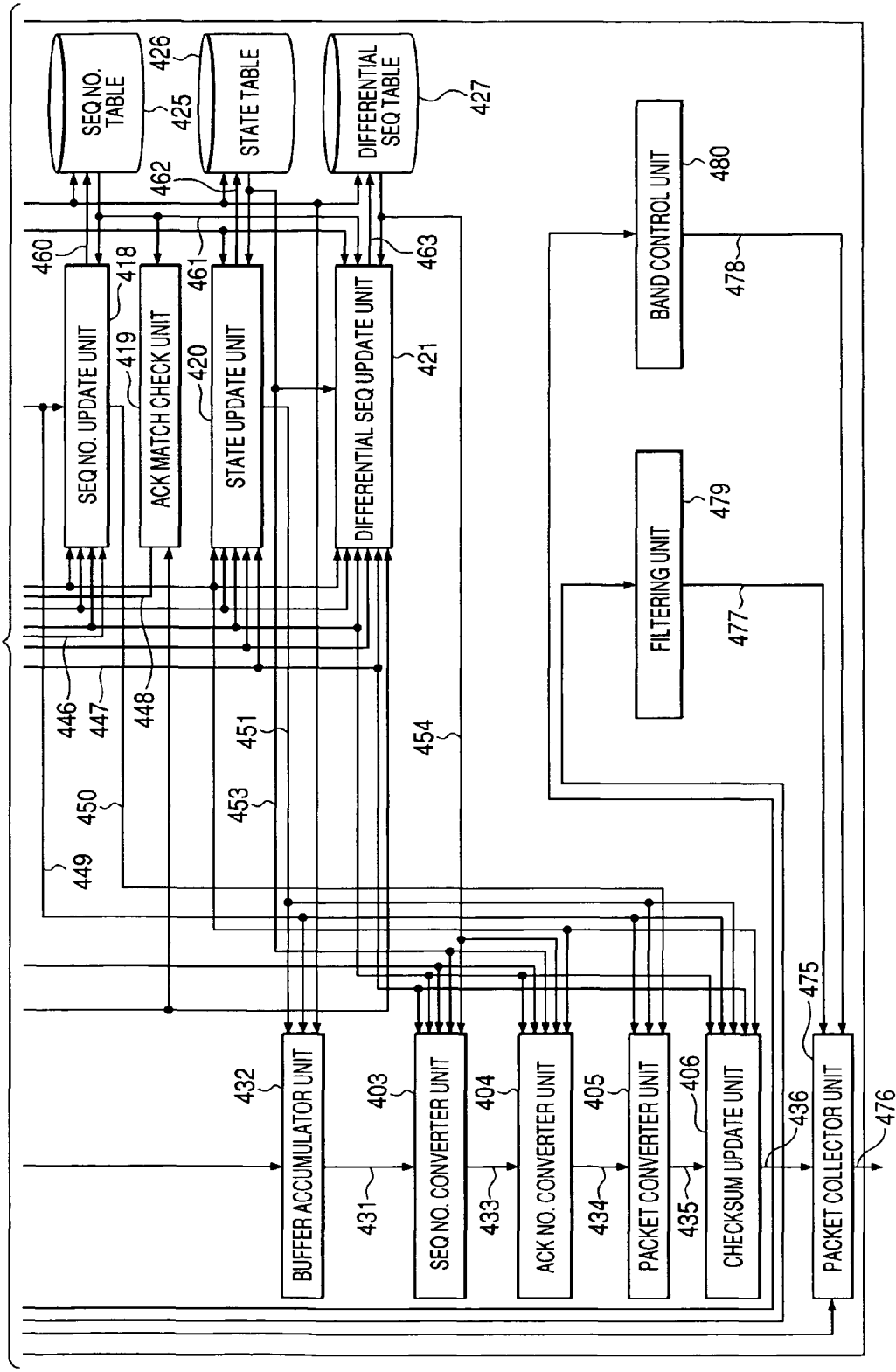

SIP-TIP TABLE 422

TIME TABLE 423

LIMIT TIME TABLE 424

SEQ NO. TABLE 425

STATE TABLE 426

DIFFERENTIAL SEQ TABLE 427

DEVICE FOR PROTECTION AGAINST ILLEGAL COMMUNICATIONS AND NETWORK SYSTEM THEREOF

CLAIM OF PRIORITY

The present application claims priority from Japanese application JP 2006-052181 filed on Feb. 28, 2006, the content of which is hereby incorporated by reference into this application.

FIELD OF THE INVENTION

This invention relates to a communication device for protection from illegal communications and an illegal communication protection device and network system thereof.

BACKGROUND OF THE INVENTION

In recent years, network security has become of ever increasing importance due to the establishment of laws protecting individual information and IP (Internet Protocol) network lifelines typified by the Internet.

Many companies and individuals routinely install devices for protection against illegal communications such as FW (firewalls), IDS (Intrusion Detection Systems), and IPS (Intrusion Prevention Systems) at access points with the communication service provider in order to prevent attacks on the server installed for that network and prevent information leaks from PC installed in that network and in that way protect their information resources.

These types of devices that protect against illegal communications detect hosts attempting illegal communications, and along with rejecting the illegal communication from the detected host or limiting the bandwidth of the illegal communication, also safeguard legal communications.

Illegal communications using TCP protocol are rejected, and legal communications using TCP protocol are protected by methods such as storing the communication status in the session table and judging whether the communication is legal or not according to a proxy reply via a SYN-ACK packet (See Christoph L. Schuba, Ivan V. Krsul, Markus G. Kuhn, Eugene H. Spafford, Aurobindo Sundarum, Diego Zamboni, "Analysis of a Denial of Service Attack on a TCP", IEEE Symposium, May 1997, P. 208-223).

However there are also attacks that cannot be prevented just by installing these illegal communication protective devices (FW, IDS, IPS) at access points. An attacker might for example use a captured server and multiple zombie servers to send massive amounts of packets to a router on the communication path where a client PC is communicating with a Web server, to lower that router's packet transmit capability. The packets flowing between the PC and server are in that case discarded at router that was attacked so that normal communication is impossible.

Defending against these type of attacks required the communication service provider to add functions to protect against illegal communications in the edge router at the connection point with other networks on the upstream side of that network, analyze all communications carried out on the network, to reliably detect and reject all types of illegal communications in order to prevent attacks on routers and servers including DDoS (Distributed Denial of Service) and massive amounts of communications such as P2P (Peer to Peer) that cripple communications.

Though company and private networks are generally connected with the communication service provider's network at one point, the communication service provider's network on the other hand is connected with other communication service provider networks at multiple points.

The communication service provider network utilizes shortest path search algorithms such as RIP (See C. Hedrick "Routing Information Protocol", RFC1058, June 1998.) and OSPF (See J. Moy, "OSPF Version 2", RFC1583 March 1994.) as routing protocols within the network. Therefore in some cases, the forward path and return paths during communication with the host might be different.

Protecting against illegal communications requires making a session table for recording communication data including the connection request source address, connection request destination address, and the recording time showing the time that the most recent communication occurred.

Methods for overwriting communication data recorded in the session table include searching the table utilizing a hash mark and where there is no matching data, overwriting data with the oldest recorded time among the multiple communication data (See "Resisting SYN flooding DoS attacks with a SYN cache", Proceedings of USENIX BSDCon' 2002, February 2002, p. 89-98".

SUMMARY OF THE INVENTION

There are types of attacks that cannot be prevented merely by installing illegal communication protective devices at the contact point between the private or company network and the communication service provider network. Therefore, legal communications must also be protected as well as adding functions to protect against illegal communications in the edge router at the connection point with other networks on the upstream side of that network, detecting the host carrying out illegal communications, and rejecting illegal communications or restricting the bandwidth of illegal communications coming from that detected host.

Rejecting the illegal communication by utilizing devices that protect against these types of illegal communications (attacks) is described next while referring to FIG. 22.

A SYN packet 1703 with a falsified transmit source IP address is sent with A as the transmit sequence No. (SEQ No.) from a host 1701 of an attacking user towards another host 1702. When this SYN packet 1703 arrives at the illegal communication protection device 1700, a random value B is attached to the SEQ No. (process 1708) of SYN-ACK packet 1704 and this SYN-ACK packet 1704 returned to the falsified transmit source IP address. The host 1701 of the attacking user cannot receive this SYN-ACK packet 1704 (process 1706) because the transmit source IP address was falsified, the protection device 1700 does not know the value B of the SEQ number attached to the SYN-ACK packet 1704. Even supposing the attacking user host 1701 predicts an E for value B, and sends an ACK packet 1705 set with an ACK No. of E+1 to the connection request destination host 1702 (process 1707), that ACK No. does not match the predicted value for B+1 so that communication between the transmit source IP address and connection request host 1702 is judged abnormal and the ACK packet 1705 is discarded (process 1709).

The protection device 1700 in this way severs the communication since the transmit source, SEQ No. and ACK No. of the illegal communication were falsified.

On the other hand, when a packet is judged a legal communication during illegal communication protection as shown in FIG. 2, the forward path and return path for that packet must be the same path in order to perform process 1619 for converting the SEQ No. of data packet 1613 from the connection request destination host 1602 by using SEQ No. C written in the SYN-ACK packet 1610 sent from the connection request destination host 1602. However the forward and return paths are different on networks of communication service providers using routing with the technology in non-patent documents 2 and 3 so that using the above described illegal communication protection causes the problem that legal (normal) communication becomes impossible.

The problem of normal communication becoming impossible when using the above illegal communication protection while the forward and returns communication paths are different is described next while referring to FIG. 23 and FIG. 24.

FIG. 23 shows the case where a genuine (authorized) user 1811 is communicating with a host 1812. There are four networks 1801 through 1804 between the genuine user host 1811 and the host 1812, and the forward path is set along a path 1840 via a network 1801 and an illegal communication protection device 1820; and the return path is set on a path 1850 via a network 1803 by a communication device 1822. When the host 1811 of the genuine user sends a SYN packet 1903 with A as the sequence number (SEQ No.) to the host 1812, the illegal communication protection device 1820 returns a SYN-ACK packet 1904 with a random value B attached to the SEQ No. (process 1910), to the host 1811. Afterwards, when the host 1811 sends and ACK packet 1905 to the connection request destination host 1812, the illegal communication protection device 1820 decides whether or not the receive sequence number (ACK No.) for the ACK packet 1905 matches the SEQ No. +1 attached in the process 1910. The illegal communication protection device 1820 identifies this as a genuine communication only when they match (process 1911), and sends a SYN packet 1908 with A as the SEQ No. and 0 as the ACK No., to the connection request destination host 1812. The connection request destination host 1812 that received the SYN packet 1908, returns the SYN-ACK packet 1906 attached with a random value C to the SEQ No. (process 1913) to the connection request source host 1811. This SYN-ACK packet 1906 arrives at the genuine user host 1811 by way of the path 1850 so the illegal communication protection device 1820 does not perform conversion on the SEQ No. The SEQ No. for the SYN-ACK packet 1906 is different from the value B that the genuine user host 1811 is expecting and so the packet is discarded (processes 1830 and 1912). Moreover the illegal communication protection device 1820 does not receive the SYN-ACK packet 1906 and so the genuine user host 1811 cannot pass along the transmitted data packet 1907 (process 1914). The illegal communication protection device 1820 can eliminate the illegal communication 1860 from the attacking user 1810.

In the protection from illegal communications described above, the volume of communication data recorded in the session table greatly increases when massive quantities of connection requests generated at random from a falsified transmit source address are continually sent to a specified host. Communication data for genuine (correct) communication has a large RTT (Round Trip Time) between the connection request source host and connection request destination host as well a delayed state transition so that its update (rewrite) frequency is low which makes it prone to be overwritten, and causes the problem of a large probability of failure to protect genuine (or correct) communications.

In order to resolve these problems, the invention provides a communication device including a routing method usable with illegal communication control at multiple points in contact with the communication service provider network; and an illegal communication protection device including a method for protecting against illegal communications by minimizing the rate of failure in protecting genuine communications with a large RTT even if illegal communications are sent on a massive scale; and a network system containing those devices.

In an aspect of this invention, a communication device is connected to a network, for receiving packets exchanged over networks, and transmitting packets based on the packet destination, and that communication device is characterized in including a control unit, and a storage unit for storing a routing table that stores the destination information; and when the received packet is a connection request, the control unit stores the transmit source address of that packet linked to the line number where that packet was received, into a routing table, and where there is no connection request from the received packet, the control unit refers to the routing table, acquires the line number linked to an address matching the destination address of that packet, and sends the applicable packet via the acquired line number.

This invention includes a device and network system with a routing method for implementing illegal communication control at multiple points in contact with the communication service provider network; and further includes a method for protection against illegal communication that minimizes the probability of failure to safeguard normal communications with a long RTT, even when illegal communications are sent on a massive scale;

BRIEF DESCRIPTION OF THE DRAWINGS

FIG. 11 is a block diagram showing the structure of the illegal communication protection device of the embodiment of this invention;

DETAILED DESCRIPTION OF THE PREFERRED EMBODIMENTS

The network system of an embodiment of the invention is described immediately hereinbelow.

Figure 1:
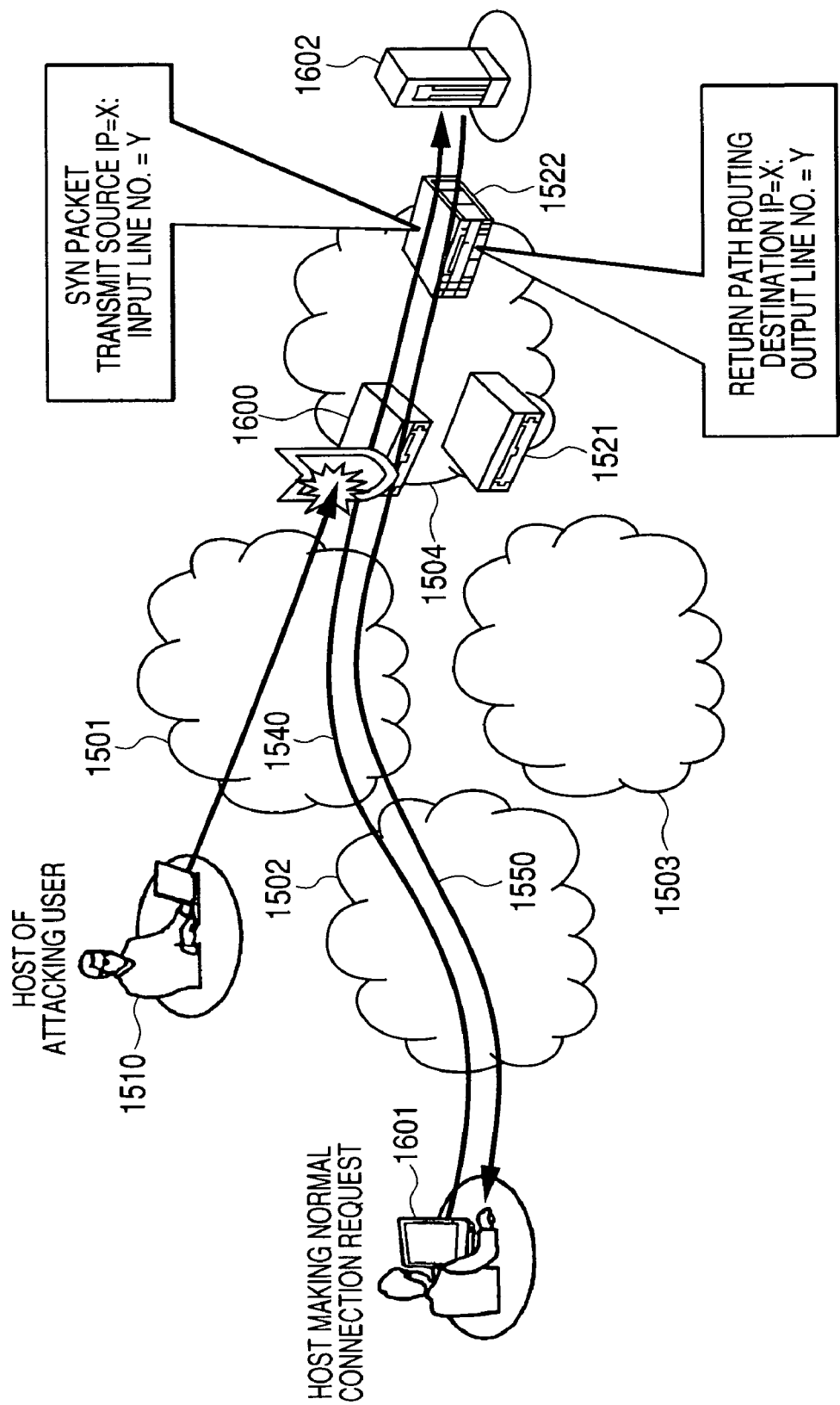
FIG. 1 is a drawing for describing the network system of the embodiment of this invention.

FIG. 1 is a concept diagram for describing the network system of the embodiment of this invention. This drawing shows the process for protection from illegal communications, with multiple illegal communication protection devices 1600 installed at multiple contact points upstream in the network.

The network system shown in FIG. 1 includes a network 1504 containing a communication device 1522, and illegal communication protection devices 1600 and 1521, and upstream networks 1501, 1502, and 1503.

A host 1601 is connected to the network 1502, and a host 1602 is connected to the network 1504. This host 1601 is registered as the host of a genuine user for sending genuine connection requests to the host 1602.

The host 1601 sends connection request to the host 1602 via the networks 1502, 1501 and 1504. This connection request is sent via the illegal communication protection device 1600 along the network 1501 to the host 1602 via a path 1540 on the network 1504.

The illegal communication protection device 1600 decides from the contents of the communication data sent to the network 1504 whether the communication is illegal. If illegal, then the illegal communication protection device 1600 severs that communication.

The communication device 1522 contains a routing unit and sends the received packet to the correct destination.

The operation of the above structured network is described next.

Figure 2:
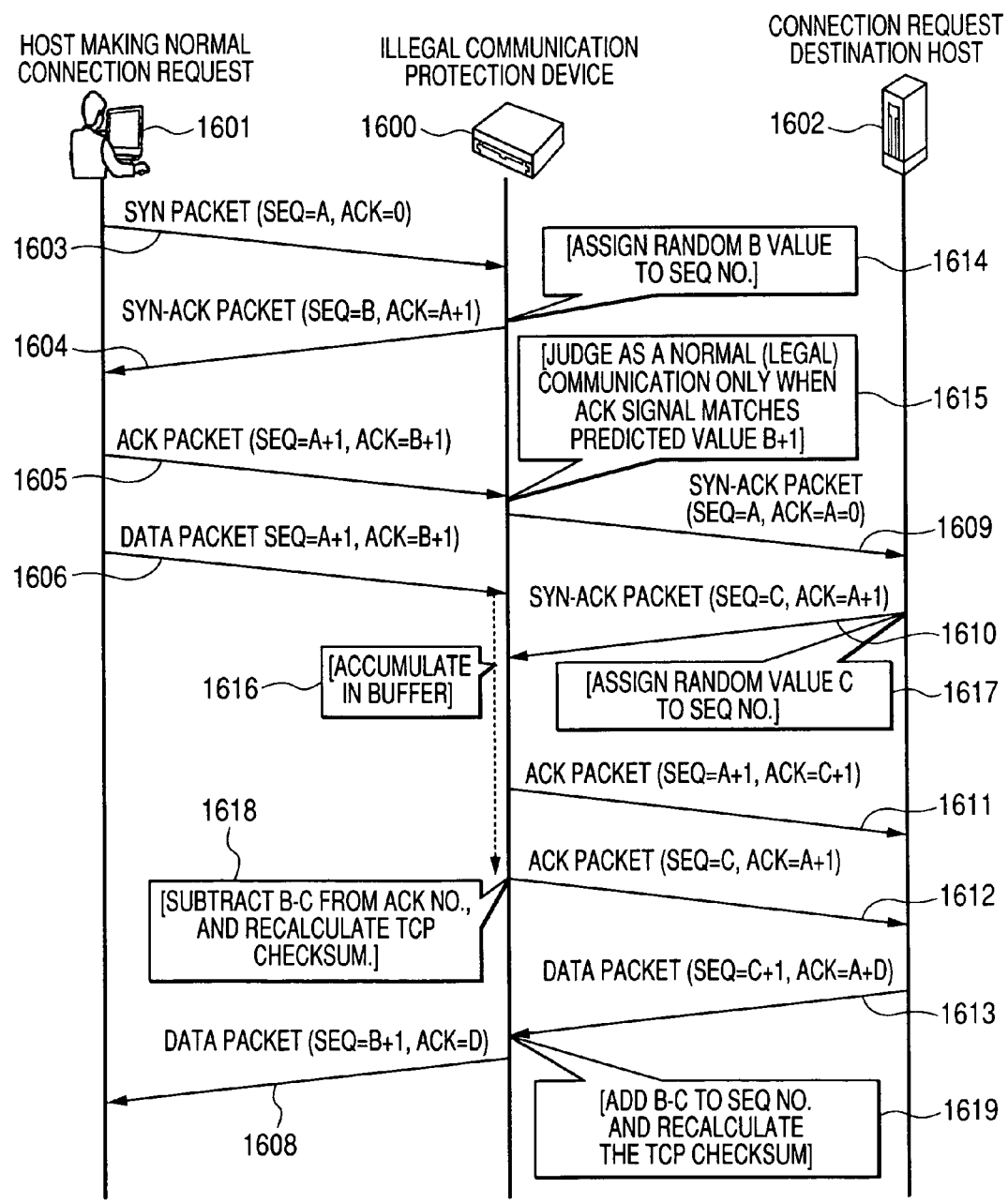
FIG. 2 is a sequence diagram showing the operation of the network system of the embodiment of this invention.

FIG. 2 is a sequence diagram showing the operation of the network system of the embodiment of this invention.

The sequence diagram in this FIG. 2 shows the process for sending the connection request sent from the host 1601 serving as the host of the genuine user, to the host 1602 via the illegal communication protection device 1600 in the network 1504.

The genuine user's host 1601 sends a SYN packet 1603 whose transmit sequence number (hereafter called "SEQ No.") is set to "A", and whose receive sequence number (hereafter called "ACK No.") is set to "0", to the host 1602 as the destination. The illegal communication protection device 1600 in the network 1504, receives the SYN packet 1603 via the networks 1502 and 1501.

When the illegal communication protection device 1600 receives the SYN packet 1603, it attaches a random value "B" to the SEQ No., and "A+1" to the ACK No. to generate a SYN-ACK packet 1604 (process 1614). The device 1600 returns this SYN-ACK packet 1604 to host 1601 as the connection request source.

When the SYN-ACK packet 1604 is received, the host 1601 sets "A+1" in the SEQ No., and "B+1" in the ACK No. and sends the ACK packet 1605 to the connection request host 1602 as the destination.

When the illegal communication protection device 1600 receives the ACK packet 1605, it checks the ACK No. of this ACK packet 1605 and decides whether or not this ACK No matches a value with a 1 added to the SEQ No. in the process 1614. If this ACK No matches that value then the illegal communication protection device 1600 decides it is a genuine (legal) communication (process 1615). The device 1600 then generates a SYN packet 1609 set respectively with an "A" in the SEQ No., and a "0" in the ACK signal. This SYN packet 1609 is then sent to the destination of the host 1602 as the connection request destination from the host 1601. This SYN packet 1609 is sent via the communication device 1522 to the host 1602 over the network 1504.

When the host 1602 which is the connection request destination, receives the SYN packet 1609, it generates (process 1617) a SYN-ACK packet 1610 with a random value "C" attached to the SEQ. No, and an "A+1" attached to the ACK No. The host 1602 returns this SYN-ACK packet 1610 to the connection request source host 1601.

When the illegal communication protection device 1600 receives the SYN-ACK packet 1610 it sends an ACK packet 1611 respectively set with an "A+1" in the SEQ No., and a "C+1" in the ACK No. to the connection request destination host 1602 as the destination.

After the connection request source host 1601 has sent the ACK packet 1605, it sends a normal data packet 1606 to the host 1602 as the destination.

The illegal communication protection device 1600 stores the received data packets 1606 in the buffer (process 1616) until the process of sending the ACK packet 1611 to the connection request destination host 1602 is completed. When the process of sending the ACK packet 1611 to the connection request destination host 1602 has ended, the illegal communication protection device 1600 subtracts the difference between the SEQ No. "B" of SYN-ACK packet 1604 and the SEQ No. "C" of SYN-ACK packet 1610, from the ACK number, to recalculate the TCP checksum (process 1618). A data packet 1612 with this TCP checksum attached is then sent to the connection request destination host 1602 as the destination.

The illegal communication protection device 1600 on the other hand, receives the data packet 1613 sent from the connection request destination host 1602. The illegal communication protection device 1600 adds the difference between the SEQ No. "B" of SYN-ACK packet 1604 and the SEQ No. "C"

of SYN-ACK packet 1610 to the SEQ No. to recalculate the TCP checksum (process 1619). A data packet 1608 with this TCP checksum attached is then sent to the connection request source host 1601 as the destination.

Figure 3:
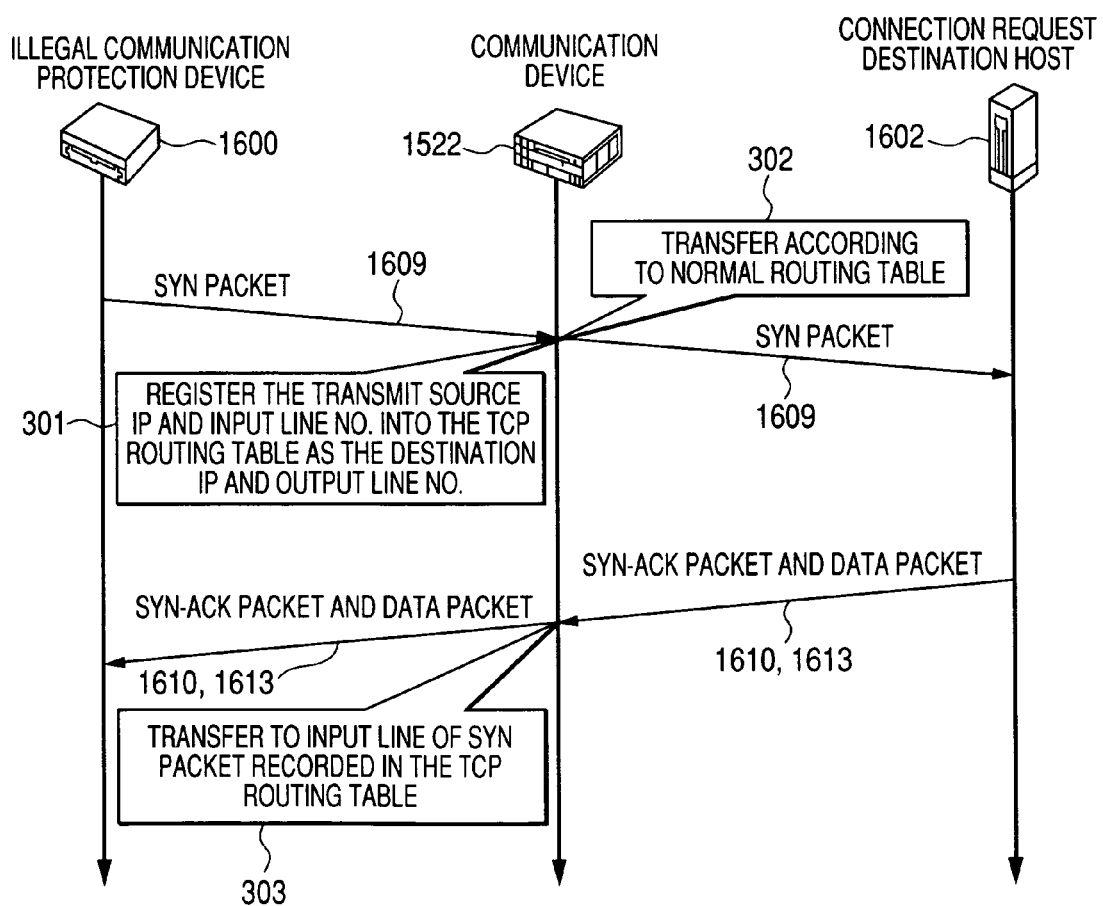
FIG. 3 is a sequence diagram for communications among the illegal communication protection device, the communication device, and the host in the embodiment of this invention.

FIG. 3 is a sequence diagram for communications among the illegal communication protection device 1600, the communication device 1522 and the host 1602 in the network 1504.

The communication device 1522 in the network 1504 receives the SYN packet 1609 addressed to the connection request destination host 1602 from the illegal communication protection device.

The communication device 1522 acquires the transmit source IP address and input line No. from the received SYN packet, and registers them respectively in the TCP routing table as the destination IP address and output line number (process 301). The communication device 1522 then transfers the SYN packet 1609 in compliance with the normal routing table (process 302).

When the connection request destination host 1602 receives the SYN packet 1609, it generates a SYN-ACK packet 1610 with a random value "C" attached to the SEQ No. (process 1617), and returns this SYN-ACK packet 1610 addressed to the connection request source host 1601.

When the communication device 1522 receives this SYN-ACK packet 1610, it acquires the destination IP address, and checks the TCP routing table. The communication device 1522 then transfers (process 303) this SYN-ACK packet 1610 to the input line of the SYN packet 1609 registered in the process 301.

This processing in the communication device 1522 ensures that the SYN-ACK packet 1610 will pass along the path 1550 on the network 1504 and always arrive at the illegal communication protection device 1600 that received the SYN packet 1609 rather than another illegal communication protection device 1521. The processing for sending the ACK packet 1611 to the connection request destination host 1602, and the process 1618 for subtracting the difference between SEQ No. B of SYN-ACK packet 1604 and SEQ No. C of SYN-ACK packet 1610 from the ACK number of data packet 1606 and recalculating the TCP checksum are correctly performed in this way.

The data packet 1613 sent from the host 1602 as the connection request destination is transferred in the same way to the input line of the SYN packet 1609 registered in the TCP routing table in process 301. The data packet 1611 consequently always arrives at the illegal communication protection device 1600. The process 1619 for adding the difference between SEQ No. B of SYN-ACK packet 1604 and SEQ No. C of SYN-ACK packet 1610, to the SEQ No. of data packet 1613 and recalculating the TCP checksum is therefore performed correctly. The illegal communication protection device 1600 eliminates the illegal communications from the attacking user 1510.

Figure 4:
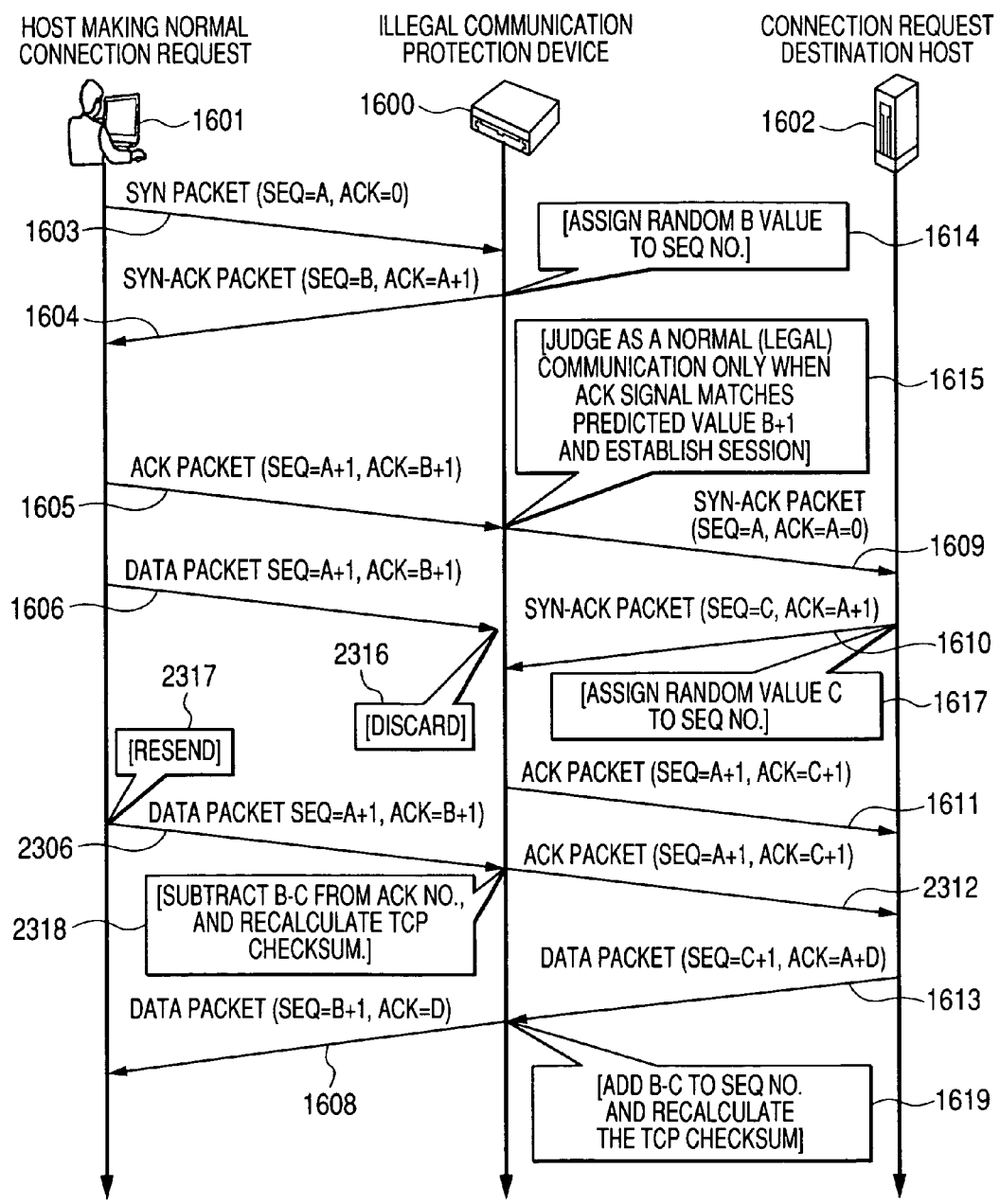
FIG. 4 is a sequence diagram showing the operation of the network system of the embodiment of this invention.

FIG. 4 is a sequence diagram showing the operation of the network system of the embodiment of this invention. FIG. 4 shows the processing when there is no buffer storage processing 1616 by the illegal communication protection device 100.

The SYN packet 1603 addressed to the connection request destination host 1602 that was sent by the connection request source host 1601 as previously described, is sent via the illegal communication protection device 1600 as the SYN packet 1609. The connection request destination host 1602 sends the SYN-ACK packet 1610 addressed to the connection source request host 1601. When the illegal communication protection device 1600 receives this SYN-ACK packet 1610, it sends an ACK packet 1611.

Here, after the connection source request host 1601 has sent the ACK packet 1605, it then sends a normal data packet 1606 addressed to the host 1602.

The illegal communication protection device 1600 discards the received data packets 1606 (process 2316) until the process for sending the ACK packets 1611 to the connection request destination host 1602 is completed.

The connection request source host 1601 resends this data packet 2306 (process 2317) when finding that the data packet 1606 has been discarded.

When the illegal communication protection device 1600 receives the data packet 2306, after processing to send the ACK packet 1611 to the connection request destination host 1602 is finished, the illegal communication protection device 1600 subtracts the difference between SEQ No. B of SYN-ACK packet 1604 and SEQ No. C of SYN-ACK packet 1610 from the ACK No. as previously described, and recalculates the TCP checksum (process 2318). The illegal communication protection device 1600 then sends the data packet 2312 with this TCP checksum attached, addressed to the connection request destination host 1602. The process from that point onwards is the same as previously described in FIG. 2.

The processing in the illegal communication protection device 1600, the communication device 1522 on the network 1504, in this way ensures that the packet being sent and received will always be sent via the illegal communication protection device 1600 that received the packet for that packet's transmit source.

The communication device of this invention is described next.

Figure 5:
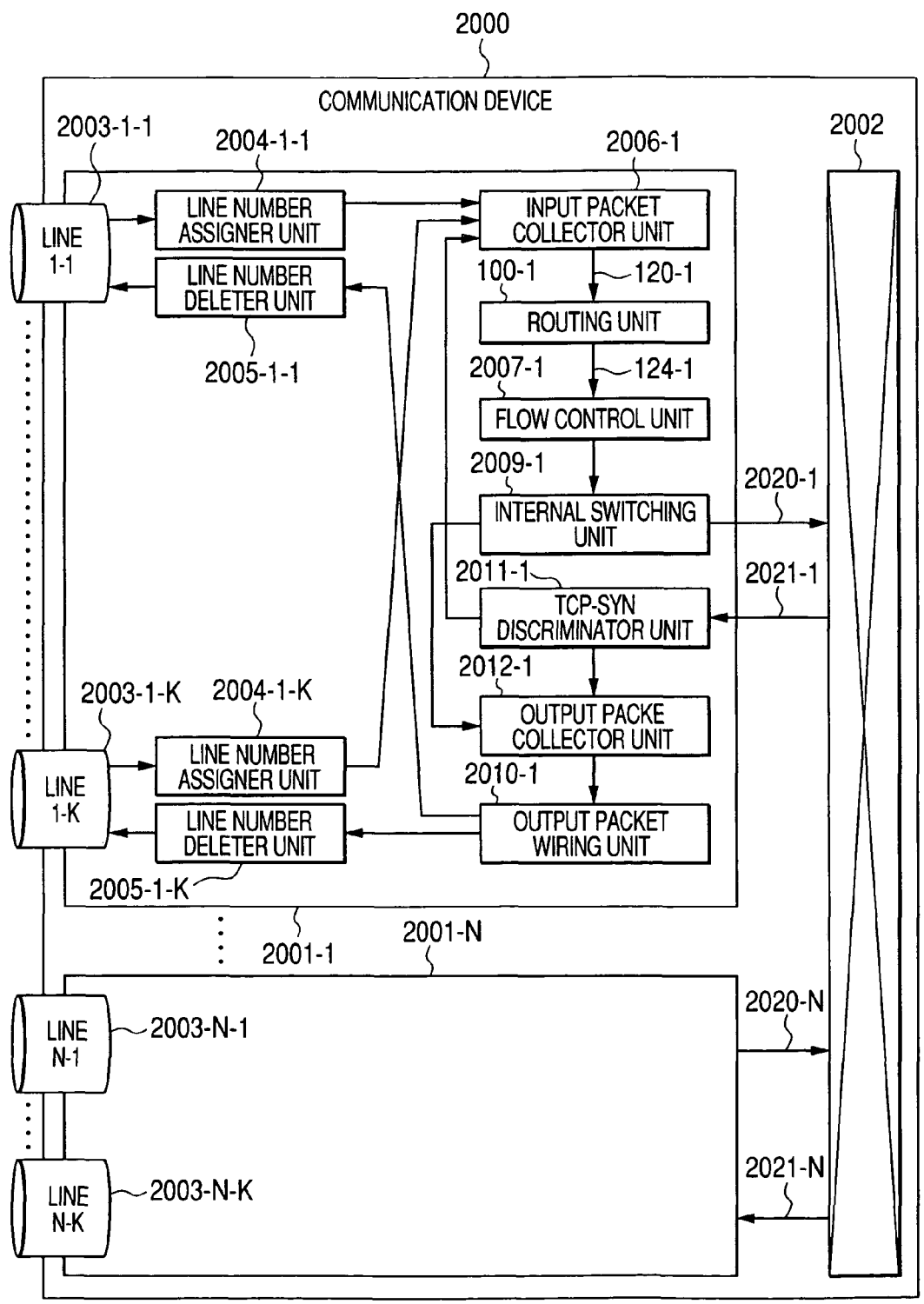
FIG. 5 is block diagram showing the structure of the communication device of the embodiment of this invention.

FIG. 5 is block diagram showing the structure of the communication device of the embodiment of this invention.

When a packet is received, the communication device 2000 extracts the ACK No., the SYN No., and destination IP address from the header information in that packet, performs routing based on that information, and sends it to the correct destination.

The communication device 2000 is comprised of N number of network interfaces 2001-$n$ (n=1 through N) and a switching unit 2002.

The switching unit 2002 switches the packet to the correct network interface 2001.

The network interface 2001-$n$ includes: K number of lines 2003-$n$-$k$ (k=1 through K) corresponding to the respective lines 2003-$n$-$k$, and a line number assigner unit 2004-$n$-$k$ (k=1 through K), as well as a line No. deleter units 2005-$n$-$k$ (k=1 through K), and an input packet collector unit 2008-$n$ and, routing units 100-$n$, and flow control units 2007-$n$, and internal switching units 2009-$n$, and TCP-SYN discriminator units 2011-$n$, and output packet collector units 2012-$n$, and output packet wiring units 2010-$n$. The case when n=1 is described next.

The line number assigner unit 2004-1-$k$ (k=1 through K) assigns line numbers to the packets input from the lines 2003-1-$k$ and converts these to an internal device format. The input packet collector unit 2006-1 collects packet data from the line number assigner unit 2004-1 and packet data from the TCP-SYN discriminator units 2011-1. The routing units 100-1 establish the output line number (No.) from the collected packet data. The flow control units 2007-1 regulate the flow of packet such as the QoS (Quality of Service) control. The internal switching units 2009-1 outputs packet data 2020-1 whose output line number is not addressed to lines 2003-1-$k$, to the switching unit 2002. Output line numbers for packet data addressed to lines 2003-1-$k$, are output to the output packet collector 2012-1 The TCP-SYN discriminator units 2011-1 outputs the switched packet data 2021-1 received from the switching unit 2002 to the input packet collector unit 2006-1, when these are SYN packets using TCP protocol. If these are not SYN packets using TCP protocol, then they are output to the output packet collector units 2012-1 described later on. The output packet collector unit 2012-1 collects packet data from the internal switching unit 2009-1 and the TCP-SYN discriminator unit 2011-1. The output packet wiring units 2010-1 outputs packet data to any of the line number deleter units 2005-1-$k$ (k=1 through K) according to the output line number of the packet data. The line number deleter units 2005-1-$k$ deletes the line number from the device internal format packet data, returns it to the original format, and sends the packet to the line 2003-1-$k$.

The routing unit 100 of communication device 2000 is described next.

Figure 6:
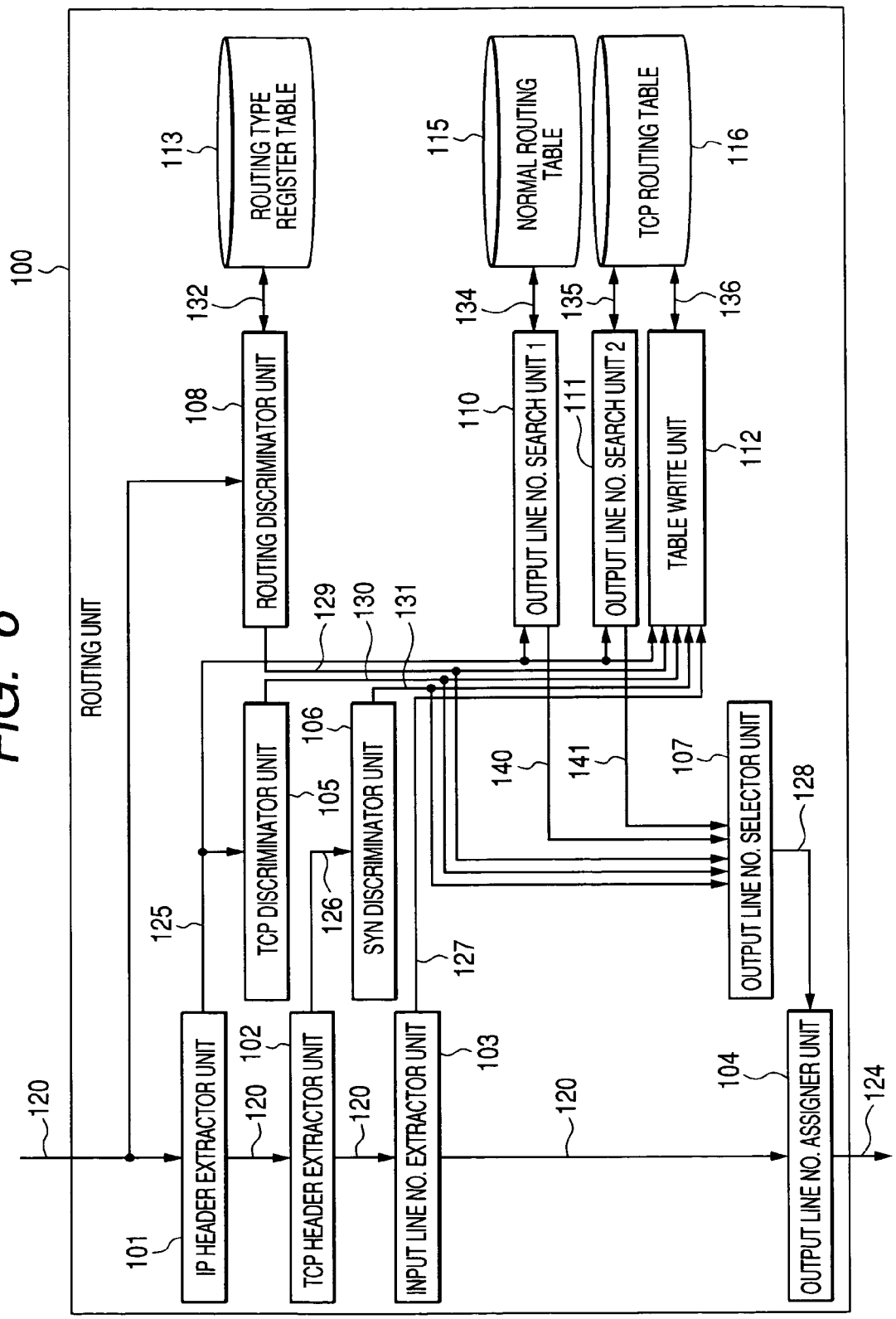
FIG. 6 is a block diagram showing the structure of the communication device of the embodiment of this invention.

FIG. 6 is a block diagram showing the structure of the routing unit 100 within the communication device 2000.

The routing unit 100 includes an IP header extractor unit 101, a TCP header extractor unit 102, an input line No. extractor unit 103, a TCP discriminator unit 105, a SYN discriminator unit 106, a routing type register table 113, a routing discriminator unit 108, a normal routing table 115, a TCP routing table 116, an output line No. search unit 1 (110), an output line No. search unit 2 (111), a table write unit 112, an output line No. select unit 107, and an output line No. assigner unit 104.

The IP header extractor unit 101 extracts the IP header from the input packet data 120. The TCP header extractor unit 102 extracts the TCP header from the input packet data 120. The input line No. extractor unit 103 extracts the input line number from the input packet data 120. The TCP discriminator 105 decides whether or not the protocol of the input packet data 120 is TCP. The SYN discriminator unit 106 decides whether or not the TCP flag of the input data 120 is SYN. The routing type register table 113 registers the type of routing for each type of packet, setting normal routing or TCP routing. The routing discriminator unit 108 decides the type of routing for the input packet data 120 by using the routing type register table 113. The normal routing table 115 records the output line number for each destination IP address by utilizing the routing protocol. The TCP routing table 116 records the output line number (No.) for each destination IP address by utilizing the input line number and the transmit source IP address for packets whose TCP flag is SYN. The output line No. search unit 1 (110) searches the normal routing table 115 for an output line number corresponding to the destination IP address of input packet data 120. The output line No. search unit 2 (111) searches the TCP routing table 116 for an output line number corresponding destination IP address for the input packet data 120. The table write unit 112 records the output line number for each destination IP address using the input packet data 120. The output line No. select unit 107 selects either of search results for output line No. search unit 2 (111) and search results for output line No. search unit 1 (110) according to the type of routing and the type of packet. The output line No. assigner unit 104 assigns the output line No. 128 selected by the output line No. select unit 107, to the input packet data 120.

Figure 7:
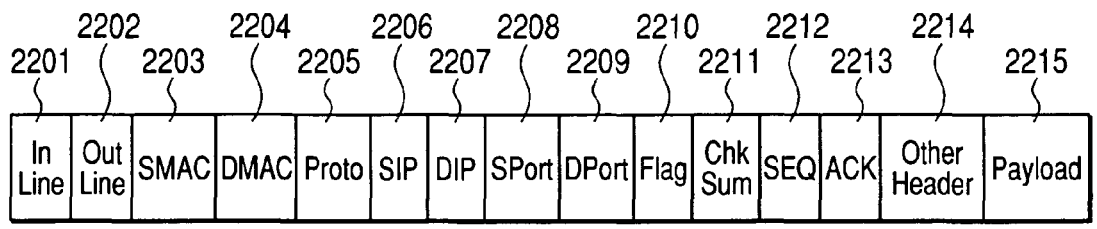
FIG. 7 is a drawing for describing the packet data of the embodiment of this invention.

FIG. 7 is a drawing for describing the packet data 120 inputted to the routing unit 100.

In the communication device 2000, the line number assigner unit 2004-1-$k$ assigns its own line number to the received packet and makes the internal packet data 120. This internal packet data 120 is input to the routing unit 100 by way of the input packet collector unit 2006.

The packet data 120 includes: InLine2201, OutLine2202, SMAC2203, DMAC2204, Proto2205, SIP2206, DIP2207, Sport2208, Dport2209, Flag2210, ChkSum2211, SEQ2212, ACK2213, OtherHeader2214, and Payload2215.

The InLine2201 stores the input line number that serves identification No for the line where the packet was input. The OutLine2202 stores the output line number serving as the identification number for the line outputting the packet. The SMAC2203 stores the transmit source MAC address serving as the transmit source address for the data link layer. The DMAC2204 stores the destination MAC address serving as the destination address. The Proto2205 stores the protocol for the network layer. The SIP2206 stores the transmit source IP address, namely the transmit source IP address serving as the address for the host on the transmit side. The DIP2207 stores the destination address, namely the destination IP address serving as the address for the host on the receive side. The Sport2208 stores the TCP transmit port. The Dport 2209 stores the TCP destination port. The flag2210 stores the TCP flag. The ChkSum2211 stores the TCP checksum. The SEQ2212 stores the transmit sequence number (SEQ No.). The ACK2213 stores the receive sequence number (ACK No.). The OtherHeader2214 stores the other IP/TCP header data. The Payload 2215 stores data other than the packet data.

The routing unit 100 operation is described next.

The routing unit 100 performs routing of packet data 120 that was input, and outputs it as the packet data 124.

The input packet data 120 that was input to the routing unit 100, is input to the IP header extractor unit 101, the TCP header extractor unit 102, the input line No. extractor unit 103, and the routing discriminator unit 108.

The IP header extractor unit 101 extracts an IP header 125 containing the Proto2205, SIP2206, DIP2207, from the input packet data 120. The extracted IP header data 125 is then output to the TCP discriminator unit 105, the output line No. search unit 1 (110), output line No. search unit 2 (111) and the table write unit 112.

The TCP extractor unit 102 extracts a TCP header data 126 including a Flag2210 from the input packet data 120. The extracted TCP header data is then output to the SYN discriminator unit 106.

The input line No. extractor unit 103 extracts the input line No. data 127 including the InLine2201 from the input packet data 120. The extracted input line No. data 127 is then output to the table write unit 112.

The routing discriminator 108 searches the routing type register table 113.

Figure 8A:
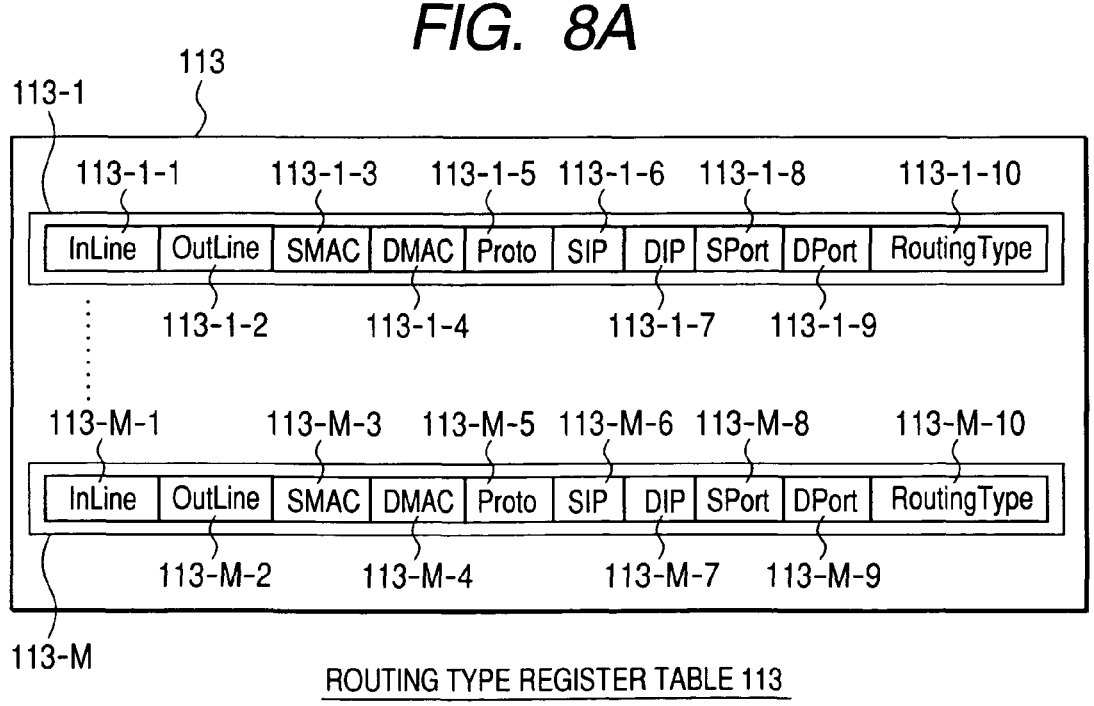
FIG. 8A is a drawing showing one example of the routing type register table of the embodiment of this invention.

FIG. 8A is a drawing showing one example of the routing type register table 113.

The routing type register table 113 contains M number of entries 113 (113-1 to 113-M).

The entry 113-$m$ (m=1 to M) includes: an InLine 113-$m$-1 (m=1 to M), an OutLine 113-$m$-2 (m=1 to M), an SMAC113-$m$-3 (m=1 to M), a DMAC113-$m$-4 (m=1 to M), a Proto113-$m$-5 (m=1 to M), a SIP113-$m$-6 (m=1 to M), a DIP113-$m$-7 (m=1 to M), a Sport113-$m$-8 (m=1 to M), Dport113-$m$-9 (m=1 to M), and a RoutingType113-$m$-10 (m=1 to M).

The InLine 113-$m$-1 stores conditions for the input line No. The OutLine 113-$m$-2 stores conditions for the output line No. The SMAC113-$m$-3 stores conditions for the transmit source MAC address. The DMAC113-$m$-4 stores conditions for the destination MAC address. The Proto113-$m$-5 stores conditions for the network layer protocol. The SIP113-$m$-6 stores conditions for the transmit source IP address. The DIP113-$m$-7 stores conditions for the destination IP address. The Sport113-$m$-8 stores the TCP transmit source port. The Dport113-$m$-9 stores the destination port for the TCP. The RoutingType113-$m$-10 stores information showing the normal routing or the TCP routing.

More specifically, the routing discriminator unit 108 searches the routing type register table 113 for an entry 113-*m* with conditions matching the input packet data 120 (process 132). Then, a RoutingType113-*m*-10 contained in that searched entry 113-*m*, is output as the routing type decision result 129, to the table write unit 112 and the output line select unit 107.

The IP header data 125 that was output by the IP header extractor unit 101, is input to the TCP discriminator unit 105.

The TCP discriminator unit 105 refers to (searches) the Proto2205 contained in the IP header data 125, and decides if the protocol is TCP or not. If the TCP discriminator unit 105 decides the protocol is TCP then it outputs a TCP decision result 130 showing a "Match", and if it decides the protocol is other than TCP then it outputs a TCP decision result 130 showing a "Mismatch", to the table write unit 112 and the output line select unit 107.

The TCP header data 126 outputted by the TCP header extractor unit 102 is input to the SYN discriminator unit 106.

The SYN discriminator unit 106 refers to (searches) the Flag2210 contained in the TCP header data 126, and decides if the TCP flag is SYN or not. If the TCP flag is SYN, then an SYN decision result 131 showing a "Match" is output, and if the TCP flag is other than SYN, then an SYN decision result 131 showing a "Mismatch" is output to the table write unit 112 and the output line select unit 107.

The IP header data 125 that was output from the IP header extractor unit 101 is input to the output line No. search unit 110 and the output line search unit 111.

The output line No. search unit 1 (110) refers to (checks) the normal routing table 115, searching for an output line No. corresponding to DIP2207 contained in the IP header data 125.

Figure 8B:
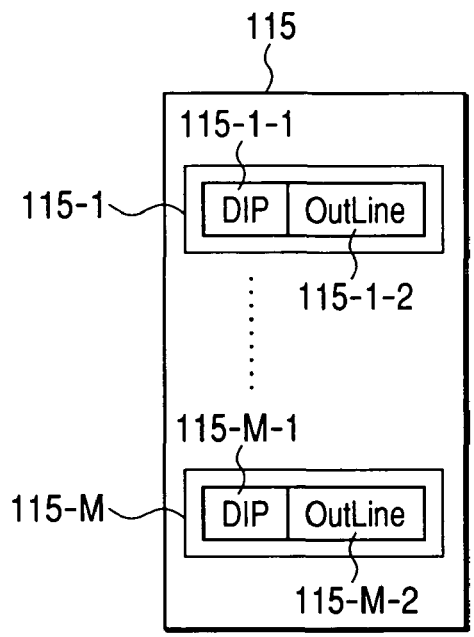
FIG. 8B is a drawing showing one example of the normal register table of the embodiment of this invention.

FIG. 8B is a drawing showing one example of the normal routing table 115.

The normal routing table 115 includes M number of entries 115-*m* (m=1 to M).

The entries 115-*m* include the DIP115-*m*-1 (m=1 to M), and an OutLine115-*m*-2 (m=1 to M). The DIP115-*m*-1 stores conditions for the destination IP address. The OutLine115-*m*-2 stores the output line number.

More specifically, the output No. line search unit 1 (110) checks the normal routing table 115, searching for an entry 115-*m* (process 134) matching the destination IP address of the DIP2207 contained in the IP header data 125. The output No. line search unit 1 (110) then outputs the OutLine 115-*m*-2 contained in the entry 115-*m* to the output line select unit 107 as the normal routing table search result 140.

The output No. line search unit 2 (111) checks the TCP routing table 116, and searches for an output line No. corresponding to the DIP2207 contained in the IP header data 125.

Figure 8C:
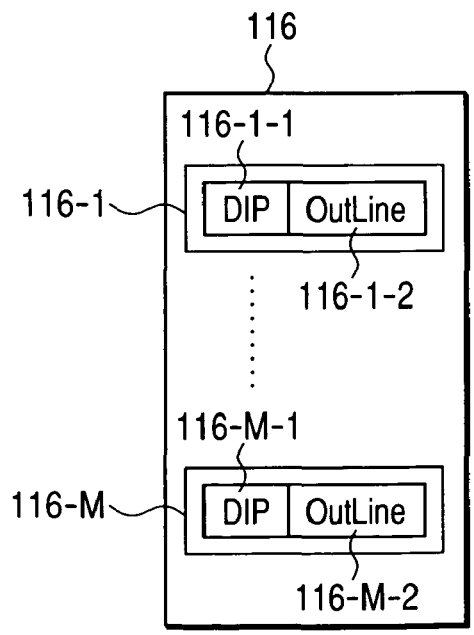
FIG. 8C is a drawing showing one example of the TCP routing table of the embodiment of this invention.

FIG. 8C is a drawing showing an example of the TCP routing table 116.

The TCP routing table 116 contains M number of entries 116-*m* (m=1 to M).

The entry 116-*m* contains the DIP116-*m*-1 (m=1 to M) and the OutLine 116-*m*-2 (m=1 to M). The DIP116-*m*-1 stores the conditions for the destination IP address. The OutLine 116-*m*-2 (m=1 to M) stores the output line No.

More specifically, the output line No. search unit 2 (111) checks the TCP routing table 116, and searches (process 135) for an entry 116-*m* matching the destination IP address of the DIP2207 contained in the IP header data 125. The output No. line search unit 2 (111) then outputs the OutLine 116-*m*-1 contained in the entry 116-*m* to the output line select unit 107 as the TCP routing table search result 141.

The IP header data 125 output by the IP header extractor 101, the routing type decision result 129 output by the routing discriminator unit 108, the TCP decision result 130 output by the TCP discriminator unit 105, and the SYN decision result 131 output by the SYN discriminator unit 106, and the input line No. data 127 output by the input line No. extractor 103, are input to the table write unit 112.

When the routing type decision result 129 is TCP routing, the TCP decision result 130 is a "Match", and also the SYN decision result 131 is a "Match", the table write unit 112 acquires the SIP2206 contained in the IP header data 125 and the InLine2201 contained in the input line No. data 127. Then, the table write unit 112 sets the acquired SIP2206 into the DIP116-*m*-1, and registers the entry 116-*m* setting the InLine2201 as the OutLine116-*m*-2, into the TCP routing table 116 (process 136).

The routing type decision result 129 output by the routing discriminator unit 108, the TCP decision result 130 output by the TCP discriminator unit 105, the SYN decision result 131 output by the SYN discriminator unit 106, the normal routing table search result 140 output by the output line search No. unit 110, and the TCP routing table search result 141 output by the output line No. search unit 111, are input to the output line NO. select unit 107.

When the routing type decision result 129 is not TCP routing, or when the routing type decision result 129 is TCP routing and the TCP decision result 130 is a "Mismatch"; or when the routing type decision result 129 is TCP routing, and the TCP decision result 130 is a "Match" and moreover the SYN decision result 131 is a "Match", then the output line No. select unit 107 outputs the OutLine 115-*m*-2 contained in the normal routing table search results 140, as the output line No. 128 to the output line No. assigner unit 104 as the final routing search results. On the other hand, when the routing type decision result 129 is TCP routing, and the TCP decision result 130 is a "Match" and moreover the SYN discriminator unit 106 is a "Mismatch" then the output line select unit 107 outputs OutLine 116-*m*-2 contained in the TCP routing search results 141, as the output line No. 128 to the output line No. assigner unit 104 as the final routing search results.

The input packet data 120 that was input to the routing unit 100, and the output line No. 128 that was output by the output line No. select unit 107, are input to the output line No. assigner unit 104.

The output line No. assigner unit 104 adds the output line No. 128 as the OutLine 2202 to the received input packet data 120 and generates the new packet data 124. This packet data 124 is then output to the flow control unit 2007.

Figure 9:
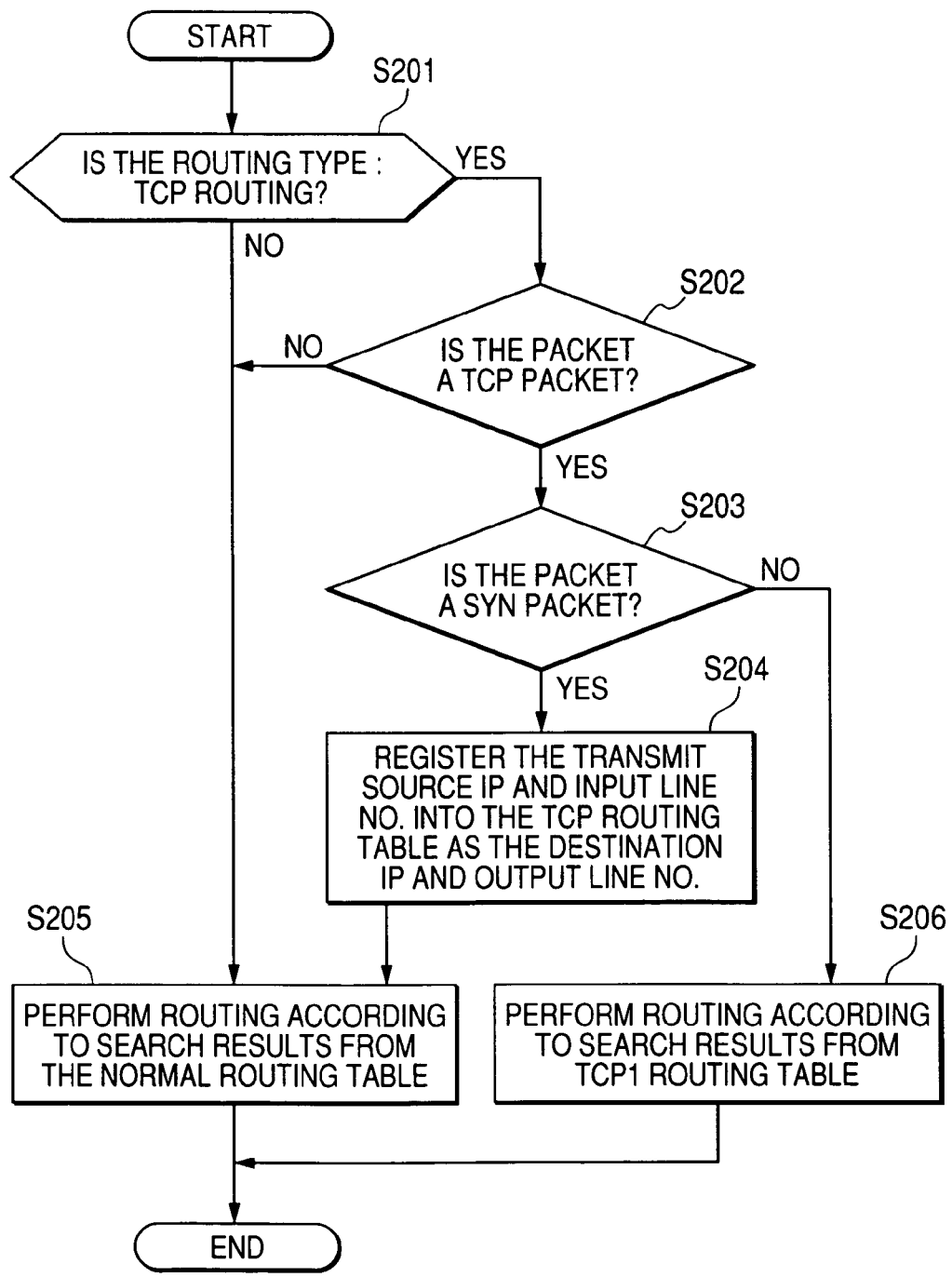
FIG. 9 is a flow chart of the processing in the routing unit of the embodiment of this invention.

FIG. 9 is a flow chart of the processing by the routing unit 100.

The routing type discriminator unit 108 first of all decides if the routing type is TCP routing or nor (step 201). If determined to be TCP routing, then the TCP discriminator unit 105 decides if the input packet data 120 is a TCP packet or not (step 202). If determined to be a TCP packet then the SYN discriminator unit 106 decides whether the input packet data 120 is a SYN packet or not (step 203). If determined to be a SYN packet, then the table write unit 112 sets the SIP2206 serving as the transmit source IP contained in the IP header data 125, and the InLine 2201 contained in the input line No. data 127 respectively into the DIP116-*m*-1 and the output line No. OutLine 116-*m*-2. The table write unit 112 then registers these 116-*m*-1 entries into the TCP routing table 116 (step 204).

On the other hand, the OutLine 115-*m*-2 contained in the normal routing table search result 140 becomes the final search result 128, when the check result in step 201 is not TCP routing, when the check result is not a TCP packet in step 202, or when the check result is a SYN packet in step 203. In other words, the packet data 120 is routed (step 205) according to the normal routing table search result 140 (step 205).

When decided in step 203 that the check results are not a SYN packet, then the OutLine 116-*m*-2 contained in the TCP routing table search results 141 is decided to be the final routing search results 128. In other words, the packet data 120 is routed (step 205) according to the TCP routing table search result 141 (step 206).

The illegal communication protection device of this invention is described next

Figure 10:
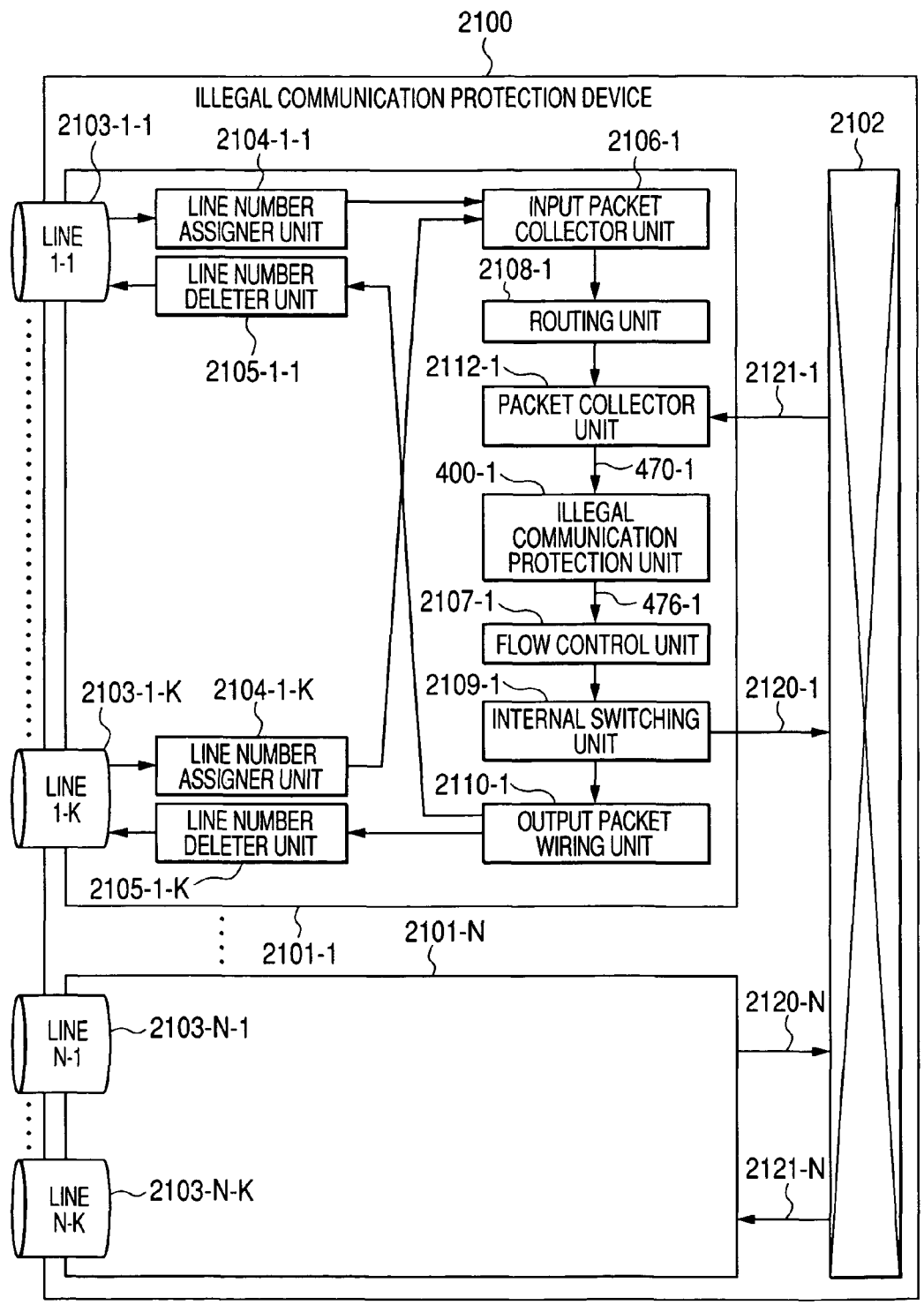
FIG. 10 is a block diagram showing the structure of the illegal communication protection device of the embodiment of this invention.

FIG. 10 is a block diagram showing the structure of the illegal communication protection device of the embodiment of this invention.

The illegal communication protection device 2100 includes N number of network interfaces 2101-*n* (n=1 to N), and a switching unit 2102 for switching the packets to the correct network interface 2102-*n*.

The network interfaces 2101-*n* include K number of lines 2103-*n*-*k* (k=1 to K), and line No. assigner unit 2104-*n*-*k* and line No. deleter units 2105-*n*-*k* (k=1 to K) corresponding to each line 2103-*n*-*k*, an input packet collector 2106-*n*, a routing unit 2108-*n* and a packet collector unit 2112-*n*, and an illegal communication protection unit 400-*n*, and a flow control unit 2107-*n*, and an internal switching unit 2109-*n*, and an output packet wiring unit 2110-*n*. The case where n=1 is described next.

The illegal communication protection unit 400-1 detects a host sending illegal communications, and while controlling the bandwidth or excluding illegal communications from the host, simultaneously safeguards the genuine legal communications.

Unlike the previously described routing unit 100, the routing unit 2108-1 only performs general routing. In other words, the routing unit 2108-1 routes the received packet by the usual routing table and outputs those results.

The other parts of the structure are essentially the same as the previously described communication device 2000. Namely, the structure includes K number of lines 2103-*n*-*k* (k=1 to K), and line No. assigner unit 2104-*n*-1 to k for assigning a line number to the packet that was input from the line 2103-*n*-*k* and converting to a device internal format; an input packet collector 2106-*n* for collecting packet data from an line No. assigner unit 2104-*n*-*k*; a packet collector unit 2112-*n* for collecting packet data received from a routing unit 2108-*n* and already switched packet data received from the switching unit 2102; a flow control unit 2107-*n* for controlling the packet flow for QoS (Quality of Service) control etc; an internal switching unit 2109-*n* for outputting packet data 2120-*n* whose output line No. is not addressed to line 2103-*n*-*k* (k=1 to K) to the switching unit 2102, and also outputting packet data whose output line No. is addressed to line 2103-*n*-*k* (k=1 to K) to the output packet wiring unit 2110-*n*; an output packet wiring unit 2110-*n* for outputting packet data to any of the line No. deleter unit 2105-*n*-*k* (k=1 to K) according to the output line No. of the packet data, and a line No. deleter unit 2105-*n* for deleting the line No. from the device internal format packet data and returning it to the original format.

The packet data 470 inputted to the illegal communication protection unit 400 is the same as previously described in FIG. 7.

Namely the packet data 470 includes: an InLine2201 for storing the input line number serving as identification number for the line where the packet was input; the OutLine2202 for storing the output line number serving as the identification number for the line outputting the packet; the SMAC2203 for storing the transmit source MAC address serving as the transmit source address for the data link; the DMAC2204 for storing the destination MAC address serving as the destination address; the Proto2205 stores the protocol for the network layer; the SIP2206 for storing the transmit source IP address which is the transmit source IP address (address for host on the transmit side); the DIP2207 for storing the destination IP address which is the destination address (address for the host on the receive side); the Sport2208 for storing the TCP transmit source port; the Dport 2209 for storing the TCP destination port; the flag2210 stores the TCP flag; the ChkSum2211 for storing the TCP checksum; the SEQ2212 for storing the transmit sequence number (SEQ No.); the ACK2213 for storing the receive sequence number (ACK No.); the OtherHeader2214 for storing the other IP/TCP header data; and the Payload 2215 for storing data other than the packet data.

FIG. 11 is a block diagram showing the structure of the illegal communication protection unit 400 for the illegal communication protection device 2100 of the embodiment of this invention.

The illegal communication protection unit 400 includes an illegal communication detector unit 471, an filtering unit 479, a bandwidth limiter unit 480, and IP header extractor unit 401, a TCP header extractor unit 402, an address generator unit 407, a TCP discriminator unit 408, a SYN discriminator unit 409, an SYN-ACK discriminator unit 410, an ACK discriminator unit 411, a timer 429, an SIP-DIP table 422, an SIP-DIP update unit 412, and SIP-DIPmatch checker 413, a DIP-SIPmatch checker 414, a time update unit 415, a limit time table 424, a time over-limit checker 416, a limit time update unit 417, a limit time retainer unit 428, a SEQ No. table 425, a SEQ No. update unit 418, an ACK match checker unit 419, a state table 426, a state update unit 420, a differential SEQ table 427, a differential SEQ update unit 421, a buffer accumulator unit 432, an SEQ No. converter unit 403, and ACK No. converter unit 404, a packet update unit 405, a checksum update unit 406, and a packet collector unit 475.

The illegal communication detector unit 471 detects illegal communications based on the input packet data 470, and outputs any of the input packet data 430, 472, 473 or 474 according to the detection results. The filtering unit 479 filters the packet data and from those results, outputs the packet data 477 that was not discarded. The bandwidth limiter unit 480 limits the bandwidth of the packet data, and from those results, outputs packet data 478 that was not discarded. The IP header extractor unit 401 extracts the IP header data 437 from the input packet data 430. The TCP header extractor unit 402 extracts the TCP header data 438 from the input packet data 430. The address generator unit 407 generates the table addresses 439 from the IP header data 437 that was extracted by the IP header extractor unit 401. The TCP discriminator unit 408 checks the IP header data 437 and decides whether that protocol is TCP or not. The SYN discriminator unit 409 checks the TCP header data 438 and decides whether that TCP flag is SYN or not. The SYN-ACK discriminator unit 410 checks the TCP header data 438 and decides whether that TCP flag is SYN-ACK or not. The ACK discriminator unit 411 checks the TCP header data 438 and decides whether that TCP flag is ACK or not. The timer 429 generates the current time 441. The SIP-DIP update unit 412 updates the contents of the destination IP address (DIP) and the transmit source IP address (SIP) recorded in an area specified by the table address 439 of the SIP-DIP table 422. The SIP-DIP match checker 413 decides whether or not the destination IP address (DIP) and the transmit source IP address (SIP) recorded in an area specified by the table address 439 of the SIP-DIP table 422 match the SIP and DIP contained in the IP header data 437. The DIP-SIP match checker 414 decides whether or not the destination IP address (DIP) and the transmit source IP address (SIP) recorded in an area specified by the table address 439 of the SIP-DIP table 422 match the SIP and DIP contained in the IP header data 437. The time update unit 415 updates the time of the most recent communication recorded in the area specified by the table address 439 of the time table 423. The time over-limit checker unit 416 decides whether or not the differential between the current time 441 and the communication time recorded in the area specified by the table address 439 of the time table 423, has exceeded the time limit recorded in the area specified by the table address 439 of the limit time table 424. The limit time update unit 417 updates the limit time recorded in the area specified by the table address 439 of the limit time table 424. The limit time retainer unit 428 pre-records the limit time used by the limit time update unit 417. The SEQ No. update unit 418 updates the SEQ No. recorded in the area specified by the table address 439 of the SEQ No. table 425. The ACK match checker unit 419 decides whether or not the SEQ No. recorded in the area specified by the table address 439 of the SEQ No. table 425, matches a value where 1 is added to the ACK No. contained in the TCP header data 438. The state update unit 420 updates the decision results recorded in the area specified by the table address 439 of the state table 426. The differential SEQ update unit 421 changes the value used for converting the sequence No. recorded in the area specified by the table address 439 of the differential SEQ table 427. The buffer accumulator unit 432 temporarily accumulates the input packet data 430 until passing or discarding of the packet is decided. The SEQ No. converter unit 403 converts the SEQ No. of the packet who passing (pass) was decided. The ACK No. converter unit 404 converts the ACK No. of the packet who passing was decided. The packet update unit 405 converts the packet data 434, generates the packet data 435, and outputs this packet data 435 to the checksum update unit 406 when the limit time recorded in the limit time table 424 was updated by the limit time update unit 417, or when the decision data results recorded in the state table 426 were updated by the state update unit 420. The checksum update unit 406 recalculates the TCP checksum of the packet data 435 and generates the packet data 436, and outputs this packet data 436 to the packet collector unit 475. The packet collector unit 475 generates the packet data 476 from the packet data 472, 436, 477, and 478 that was received and outputs this generated packet data 476 to the flow control unit 2107.

The SIP-DIP table 422 records the destination IP address (DIP) and the transmit source IP address (SIP) in an area specified by the table address 439. The time table 423 records the time of the most recent communication in an area specified by the table address 439 when communication was performed. The limit time table 424 records the limit time specifying the time for limiting overwriting of data in the area specified by the table address 439. The SEQ No. table 425 records the transmit sequence No. (SEQ No.) for attaching to the SYN-ACK packet. The state table 426 records the decision results on whether to pass or discard the packet as the Pass/Discard results. The differential SEQ table 427 records the value used in converting the sequence number of the packet who passing (pass) was allowed.

The operation of the illegal communication protection device 2100 is described next.

The illegal communication protection unit 400 processes the packet data 470 that was input, and outputs it as the processed packet data 476.

The packet data 470 that was input to the illegal communication protection unit 400 is input to the illegal communication detector unit 471.

The illegal communication detector unit 471 decides if the packet data 470 is illegal or legal. The type of illegal communication (DDOS attack, DoS attack, worm attack, P2P traffic, etc.) is identified if the packet data 470 is decided to be illegal. The packet data 470 is output to the packet collector unit 476 as the packet data 474 if identified as a legal communication. Packet data 470 that is an illegal communication and moreover is identified as a DDoS attack or DoS attack is output as the packet data 430 to the IP header extractor unit 401 and the TCP header extractor unit 402. Packet data 470 that is an illegal communication and moreover is identified as a worm attack is output as the packet data 473 to the filtering unit 479. Packet data 470 that is an illegal communication and moreover is identified as P2P traffic is output as the packet data 472 to the bandwidth limiter unit 480.

Packet data 430 that was output by the illegal communication detector unit 471 is input to the IP header extractor unit 401 and the TCP header extractor unit 402.

The IP header extractor unit 401 extracts the IP header data 437 containing the Proto 2205 and SIP2206 and DIP2207 from the packet data 430. The TCP header extractor unit 402 extracts the TCP header data 438 containing the Flag2210, the SEQ2212 and the ACK 2213 from the packet data 430.

The IP header data 437 extracted from the IP header extractor unit 401 is input to the address generator unit 407 and the TCP discriminator unit 408.

The address generator unit 407 generates a hash value based o the SIP2206 and DIP2207 contained in the IP header data 437. The address generator unit 407 outputs this hash value as the table address 439.

The TCP discriminator unit 408 decides whether the protocol is TCP or not by utilizing the Proto2205 contained in the IP header data 437. The TCP discriminator unit 408 outputs the TCP decision result 440 showing a "Match" if the protocol is TCP, or showing a "Mismatch" if the protocol is other than TCP.

The TCP header data 438 that was output from the TCP header extractor unit 402, is input to the SYN discriminator unit 409, an SYN-ACK discriminator unit 410, and ACK discriminator unit 411.

The SYN discriminator unit 409 decides whether the TCP flag is SYN or not by utilizing the Flag2210 contained in the TCP header data 438. If the TCP flag is SYN then the SYN discriminator unit 409 outputs a "Match", and if the TCP flag is other than SYN then it outputs a "Mismatch" as the SYN decision results 446. The SYN-ACK discriminator unit 410 decides if the TCP flag is SYN-ACK by using the Flag 2210 contained in the TCP header data 438. If the TCP flag is SYN-ACK, then the SYN-ACK discriminator unit 410 outputs a "Match", and if the TCP flag is other than SYN-ACK then a "Mismatch" is output as the SYN-ACK decision result 445. The ACK discriminator unit 411 decides if the TCP flag is ACK or not by utilizing the Flag2210 contained in the TCP header data 438. If the TCP flag is ACK, then the ACK discriminator unit 411 outputs a "Match", and if the TCP flag is other than an ACK flag then it outputs a "Mismatch" as the ACK decision result 444.

The IP header data 437 that was output by the IP header extractor unit 401 is input to the SIP-DIP match checker 413.

The SIP-DIP match checker 413 decides if the SIP2206 and DIP2207 contained in the IP header data 437 match the transmit source IP address and the destination IP address recorded in the SIP-DIP table 422.

Figure 12A:
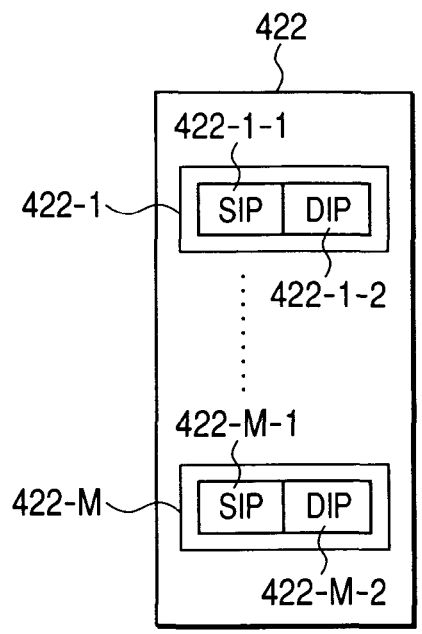
FIG. 12A is a drawing showing an example of the SIP-DIP table of the embodiment of this invention.

FIG. 12A is a drawing showing an example of the SIP-DIP table 422.

The SIP-DIP table 422 contains M number of entries 422-$m$ ($m=1$ to M). Each of the entries 422-$m$ contains an SIP422-$m$-1 (($m=1$ to M) and a DIP422-$m$-2 ($m=1$ to M). The SIP422-$m$-1 stores the transmit source IP address. The DIP422-$m$-2 stores the destination IP address.

More specifically, the SIP-DIP match checker 413 acquires the entry 422-$m$ within the SIP-DIP table 422 by utilizing the table address 439 for specifying that address (process 456). Moreover, the SIP-DIP match checker 413 decides if the SIP2206 and the DIP2207 contained in the IP header data 437 are a match or a mismatch for the SIP422-$m$ and the DIP422-$m$-2 contained in the entry 422-$m$, and outputs the decision results as the SIP-DIP match decision results 443.

The IP header data 437 that was output by the IP header extractor unit 401, is input to the DIP-SIP match checker 414.

The DIP-SIP match checker 414 acquires the entry 22-$m$ within the SIP-DIP table 422 by utilizing the table address 439 (process 456). The DIP-SIP match checker 414 further decides whether or not the DIP2207 and SIP2206 contained in the IP header data 437 match the DIP422-$m$-2 and the SIP422-$m$-1 contained in the entry 422-$m$, and output those decision results as the DIP-SIP match results 447.

The timer 429 generates the current time 441. This current time 441 is input to the time over-limit checker unit 416.

The time over-limit checker unit 416 decides whether or not the differential between the current time 441 generated by the timer 429 and the communication time recorded in the time table 423, has exceeded the limit time recorded in the limit time table 424.

Figure 12B:
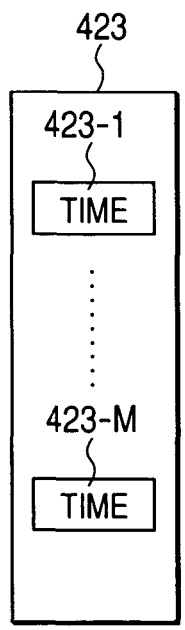
FIG. 12B is a drawing showing an example of the time table of the embodiment of this invention.

FIG. 12B is a drawing showing an example of the time table 423.

The time table 423 includes M number of communication times TIME423-$m$ ($m=1$ to M) showing the most recent time that communication was performed.

Figure 12C:
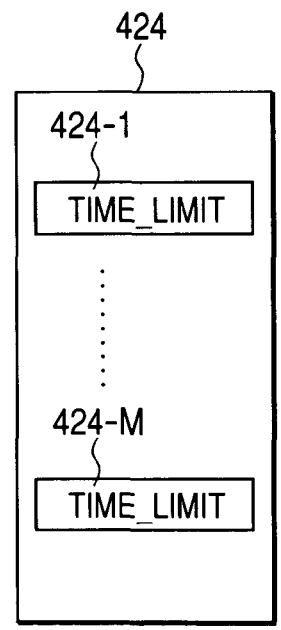
FIG. 12C is a drawing showing an example of the limit time table of the embodiment of this invention.

FIG. 12C is a drawing showing an example of the limit time table 424.

The limit time table 424 includes M number of limit times TIME_LIMIT424-$m$ ($m=1$ to M) specifying the time at which to limit the overwriting of data.

More specifically, the time over-limit checker unit 416 acquires the communication time TIME423-$m$ of the time table 423 (process 458) using the table address 439, and the limit time TIME_LIMIT424-$m$ of the limit time table 424 (process 452). The time over-limit checker unit 416 then decides if the differential between the current time 441 generated by the timer 429 and the communication time TIME423-$m$ has exceeded the limit time TIME_LIMIT424-$m$. The time over-limit checker unit 416 then outputs those check results as the over-limit time check results 442.

The TCP header data 438 outputted by the TCP header extractor unit 402, is input to the ACK match checker unit 419.

The ACK match checker unit 419 decides whether or not the ACK2213 contained in the TCP header data 438 matches a value where 1 is added to the SEQ No. recorded in the SEQ No. table 425.

Figure 12D:
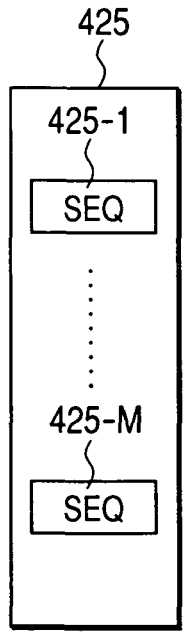
FIG. 12D is a drawing showing an example of the SEQ No. table of the embodiment of this invention.

FIG. 12D is a drawing showing an example of the SEQ No. table 425.

The SEQ No. table 425 includes M number of SEQ425-$m$ ($m=1$ to M) showing the transmit SEQ No. attached to the SYN-ACK packet.

More specifically, the ACK match checker unit 419 acquires the SEQ425-$m$ ($m=1$ to M) of the SEQ No. table 425 by using the address in the table address 439 (process 461).

The ACK match checker unit 419 then decides whether or not the ACK2213 contained in the TCP header data 438 matches a value where 1 is added to the SEQ425-$m$.

The IP header data 437 output by the IP header extractor unit 401, the SIP-DIP match decision results 443 output by the SIP-DIP match checker 413, and the over-limit time check results 442 output by the time over-limit checker unit 416, are input to the SIP-DIP update unit 412.

Figure 13:
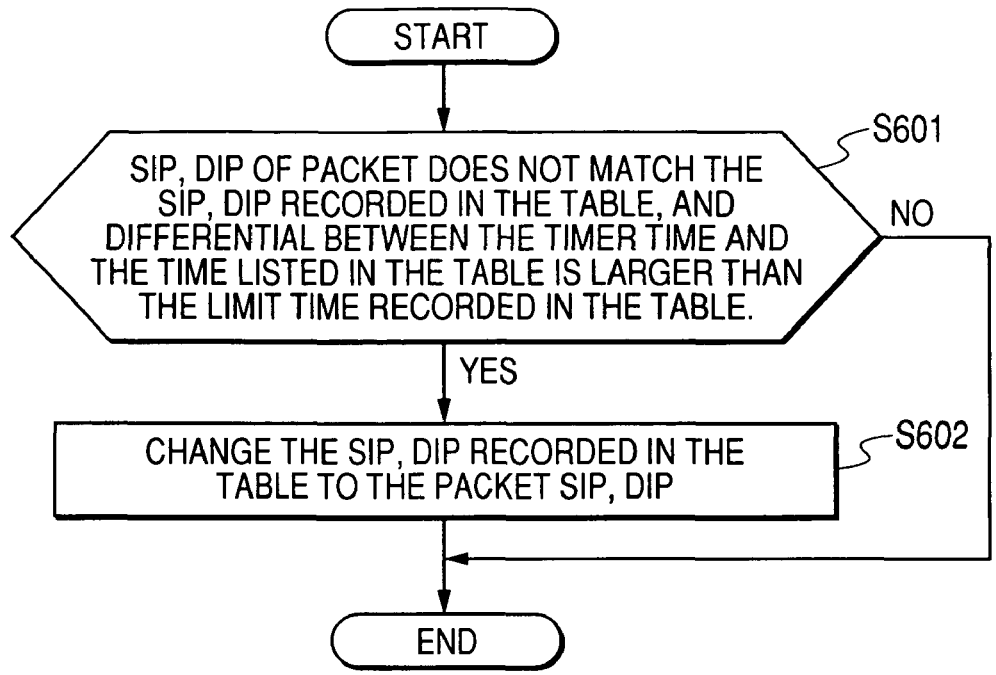
FIG. 13 is a flow chart showing the operation of the SIP-DIP renewal unit in the embodiment of this invention.

FIG. 13 is a flow chart showing the operation of the SIP-DIP update unit 412.

The SIP-DIP update unit 412 decides whether or not the received SIP-DIP match decision results 443 are a "Mismatch", and whether the received over-limit time check results 442 were exceeded or not (step 601). When the received SIP-DIP match decision results 443 are decided to be a "Mismatch", and decided that the received over-limit time check results 442 were exceeded, the SIP-DIP update unit 412 changes the SIP422-$m$-1 and the DIP422-$m$-2 contained in the entry 422-$m$ specified by the table address 439 of the SIP-DIP table 422, respectively into SIP2206 and DIP2207 contained in the IP header data, and updates the entry (step 602) (process 455).

The process updates the entry for the SIP-DIP table 422.

The current time 441 generated by the timer 429, and the SIP-DIP match decision results 443 outputted by the SIP-DIP match checker 413, and the over-limit time check results 442 output by the time over-limit checker unit 416, are input to the time update unit 415.

Figure 14:
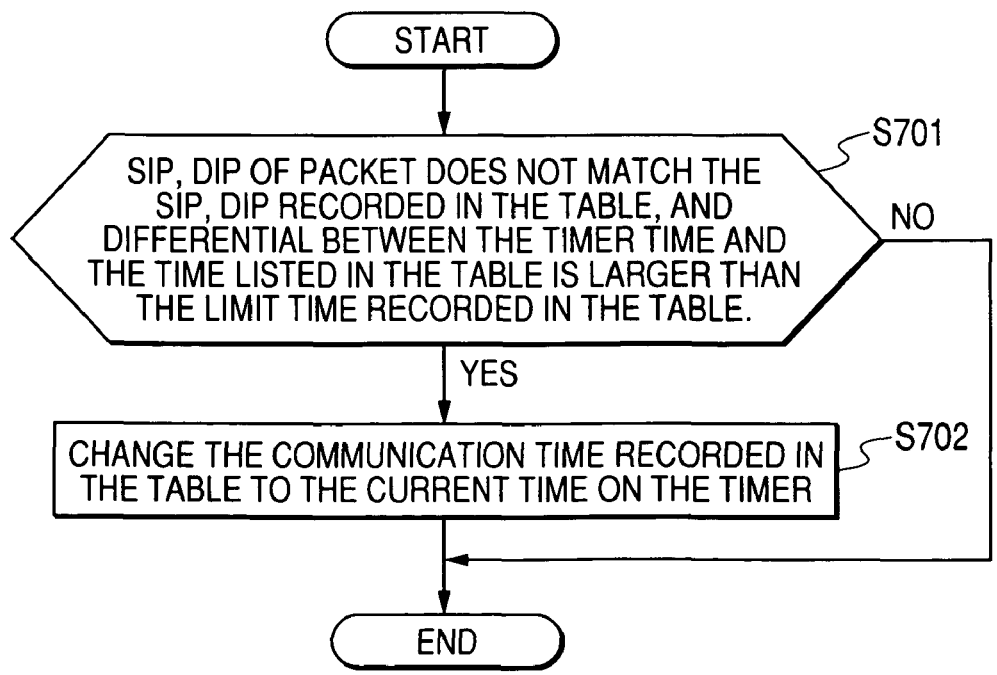
FIG. 14 is a flow chart of the time update unit of the embodiment of this invention.

FIG. 14 is a flow chart of the operation of the time update unit 415.

The time update unit 415 decides if the received SIP-DIP match decision results 443 are a "Match" or whether the received over-limit time check results 442 were exceeded or not (step 701). When decided that the received SIP-DIP match decision results 443 are a "Match" or that the received over-limit time check results 442 were exceeded, then the time update unit 415 changes the communication time TIME423-$m$ specified by the table address 439 of the time table 423, into the current time 441, and updates the current time TIME423-$m$ (step 702) (process 457).

This process updates the entry for the time table 423.

The SIP-DIP match decision results 443 output by the SIP-DIP match checker 413, and the DIP-SIP match decision results 447 output by the DIP-SIP match checker 414, and the over-limit time check results 442 output by the time over-limit checker unit 416, and the TCP decision result 440 output by the TCP discriminator unit 408, and the SYN decision results 446 output by the SYN discriminator unit 409, and the ACK decision results 444 output by the ACK discriminator unit 411, and the ACK match decision results 448 output by the ACK match checker unit 419; are input to the limit time update unit 417.

Figure 15:
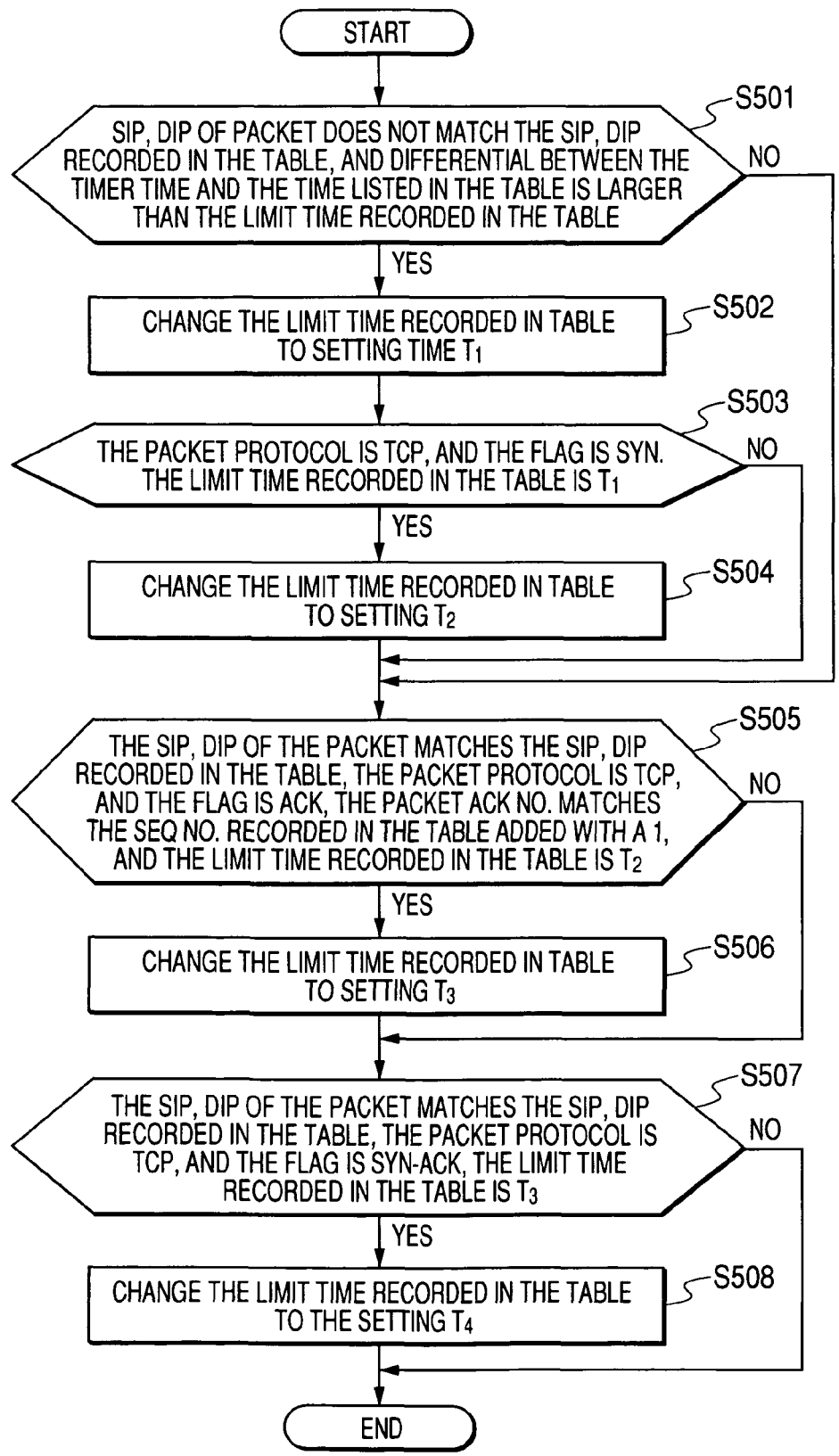
FIG. 15 is a flow chart of the limit time update unit of the embodiment of this invention.

FIG. 15 is a flow chart of the operation of the limit time update unit 417.

When the SIP-DIP match decision results 443 that were received are a "Mismatch", and the limit time update unit 417 decides whether the over-limit time check results 442 that were received are excessive or not (step 501). When the SIP-DIP match decision results 443 that were received are a "Mismatch", and the limit time update unit 417 decides whether the over-limit time check results 442 that were received are excessive or not, then the limit time TIME_LIMIT424-$m$ specified by the table address 439 of the limit time table 424 is changed to the limit time T1 465 acquired from the limit time retainer unit 428, and the limit time T1 is updated (step 502) (process 459).

The limit time update unit 417 next decides if the received TCP decision result 440 is a "Match", and if the received SYN decision result 446 is a "Match", and further if the limit time TIME_LIMIT424-*m* specified by the table address 439 of the limit time table 424 is T1 or not (step 503). If the received TCP decision result 440 is a "Match", and the received SYN decision result 446 is a "Match", and further the limit time TIME_LIMIT424-*m* specified by the table address 439 of the limit time table 424 is T1; then the limit time update unit 417 changes the limit time TIME_LIMIT424-*m* specified by the table address 439 of the limit time table 424 to the limit time T2 465 acquired from the limit time retainer unit 428, and updates the limit time T2 (step 504) (process 459).

The limit time update unit 417 next decides if the received SIP-DIP match decision results 443 are a "Match", and if the received TCP check results 440 are a "Match", and if the received ACK decision result 444 is a "Match", and if the received ACK match results 448 are a "Match", and further if the limit time TIME_LIMIT424-*m* specified by the table address 439 of the limit time table 424 is T2 or not (step 505). If these conditions are satisfied, then the limit time update unit 417 changes the limit time TIME_LIMIT424-*m* specified by the table address 439 of the limit time table 424 to the limit time T3 465 acquired from the limit time retainer 428, and updates the limit time T3 (step 506) (process 459).

The limit time update unit 417 next decides if the received DIP-SIP match decision results 447 are a "Match", and if the TCP check results 440 are a "Match", and if the SYN-ACK decision results 445 are a "Match" and further if the limit time TIME_LIMIT424-*m* specified by the table address 439 of the limit time table 424 is T3 or not (step 507). If these conditions are satisfied, then the limit time update unit 417 changes the limit time TIME_LIMIT424-*m* specified by the table address 439 of the limit time table 424 to the limit time T4 465 acquired from the limit time retainer 428, and updates the limit time T4 (step 508) (process 459). The limit time update unit 417 then outputs the limit times (T1, T2, T3, T4) before and after the updating, as the limit time 449.

The limit times (T1, T2, T3, T4) values held by the limit time retainer 428 can be changed by using the command 466 input from an external terminal 464. Setting T1 to as small a value as possible, setting T2 to a value larger than the maximum RTT time between the connection request source host and the illegal communication protection device, and setting T3 to a value larger than the RT time between the connection request source host and the illegal communication protection device, and setting T4 to a value of several minutes is recommended.

The SIP-DIP match decision results 443 output by the SIP-DIP match checker 413, the over-limit time check results 442 output by the time over-limit checker unit 416, the TCP check results 440 output by the TCP discriminator unit 408, and the SYN decision results 446 output by the SYN discriminator unit 409; are input to the SEQ No. update unit 418.

Figure 16:
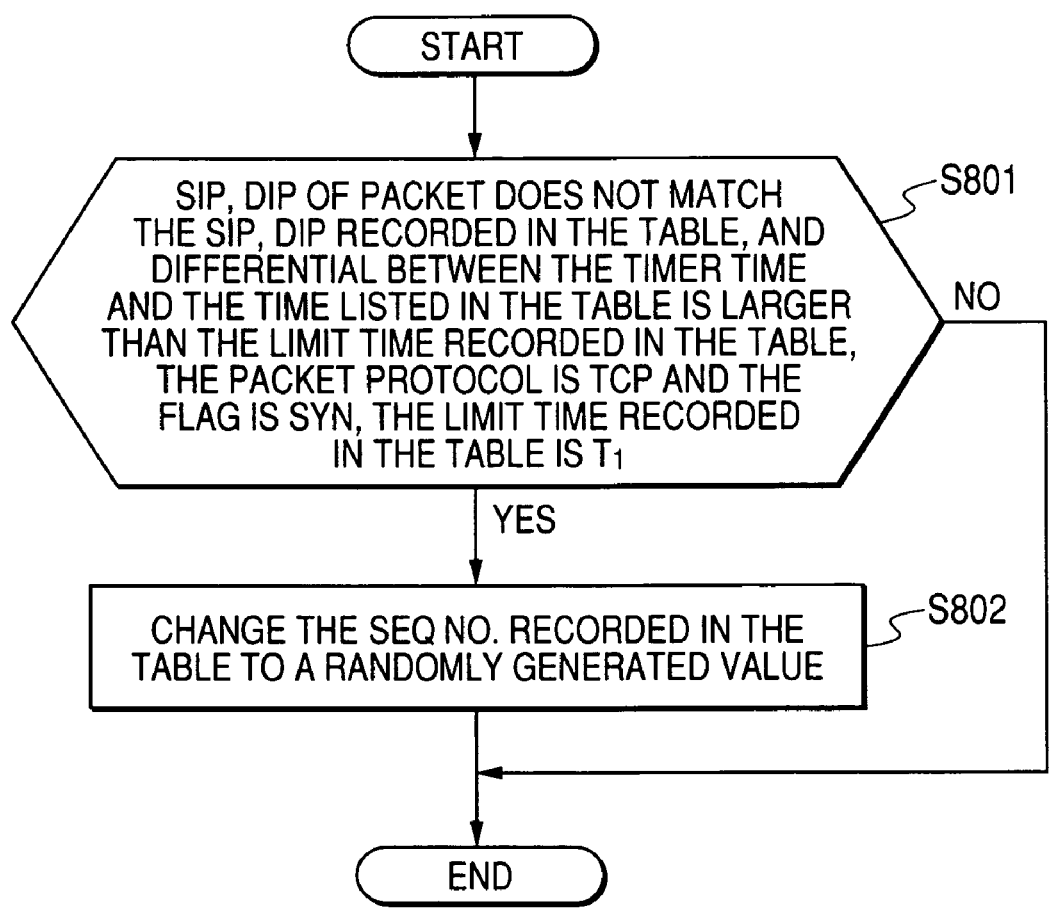
FIG. 16 is a flow chart showing the operation of the SEQ. No. update unit of the embodiment of this invention.

FIG. 16 is a flow chart showing the operation of the SEQ No. update unit 418.

The SEQ No. update unit 418 decides if the SIP-DIP match decision results 443 are a "Mismatch", and the received over-limit time check results 442 are exceeded, and if the TCP check results 440 are a "Match", and if the received SYN decision results 446 are a "Match", and moreover if the limit time TIME_LIMIT424-*m* specified by the table address 439 of the limit time table 424 is T1 or not (step 801). If these conditions are satisfied, then the SEQ No. update unit 418 changes the SEQ425-*m* (m=1 to M) specified by table address 439 of the SEQ No. table 425 to a randomly generated value 460 (step 802). This randomly generated value is then output as the random generated value 450.

The SIP-DIP match decision results 443 output by the SIP-DIP match checker 413, the DIP-SIP match decision results 447 output by the DIP-SIP match checker 414, and the over-limit time check results 442 output by the time over-limit checker unit 416, the TCP decision result 440 output by the TCP discriminator unit 408, and the SYN-ACK decision result 445 output by the SYN-ACK discriminator unit 410; are input to the state update unit 420.

The state update unit 420 updates the check results recorded in the state table 426 for specifying whether to pass or discard the packet.

Figure 12E:
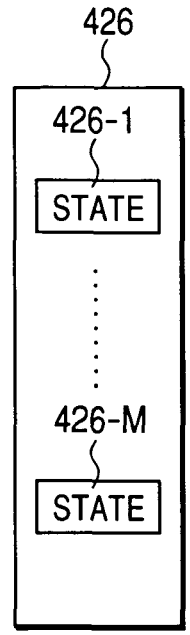
FIG. 12E is a drawing showing an example of the state table of the embodiment of this invention.

FIG. 12E is a drawing showing an example of the state table 426. The state table 426 includes an M number of Pass/Discard check results STATE426_m (m=1 to M) storing decision results on passing or discarding the packets.

Figure 17:
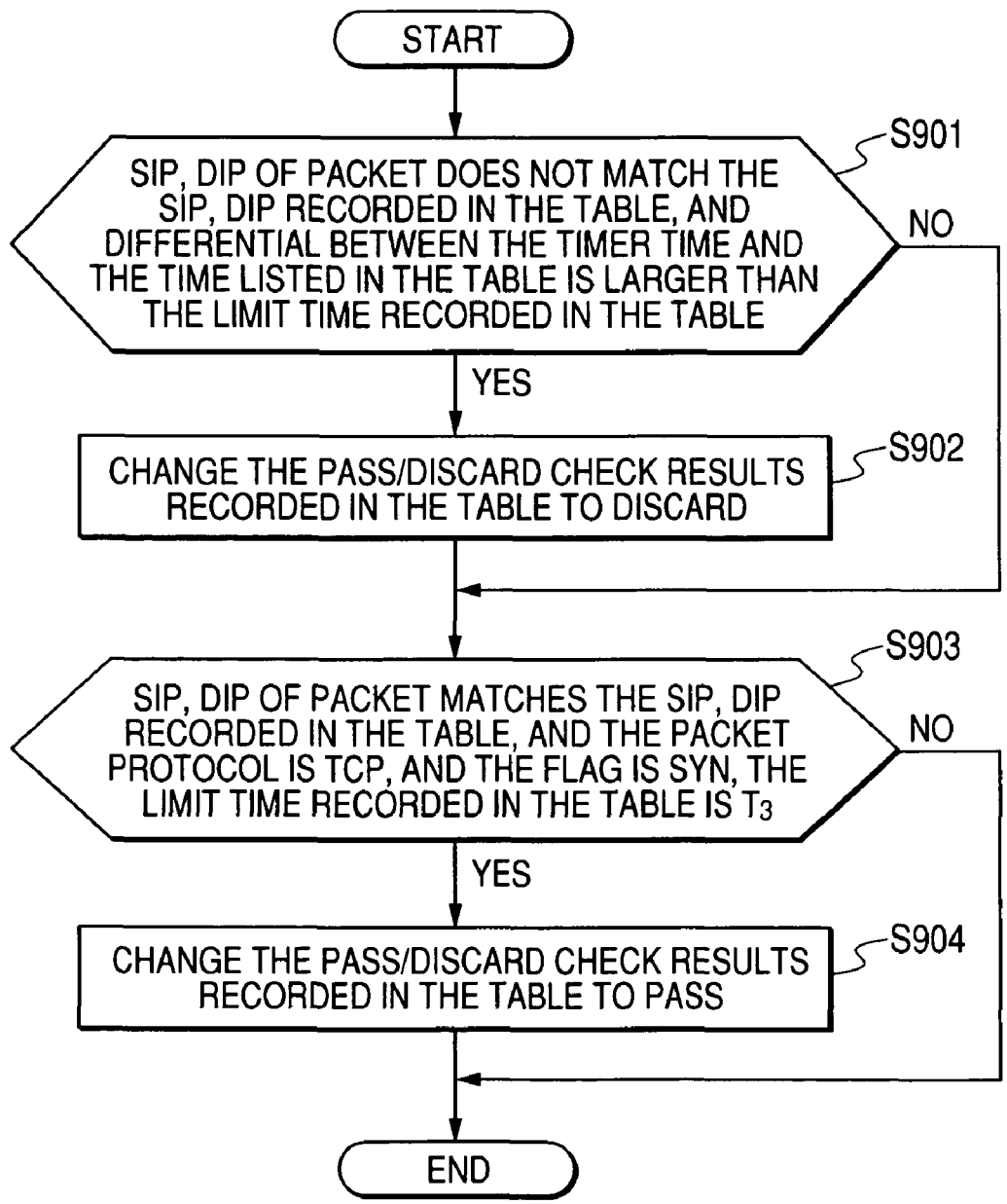
FIG. 17 is a flow chart showing the operation of the state update unit of the embodiment of this invention.

FIG. 17 is a flow chart showing the operation of the state update unit 420.

The state update unit 420 decides if the received SIP-DIP match decision results 443 are a "Mismatch", and the received over-limit time check results 442 were exceeded or not (step 901). If the SIP-DIP match decision results 443 are a "Mismatch", and the received over-limit time check results 442 were exceeded, then the state update unit 420 changes the Pass/Discard check result STATE426-*m* specified in the table address 439 of the state table 426, to "Discard" (step 902) (process 462).

The state update unit 420 next decides if the received DIP-SIP match decision results 447 are a "Match", if the TCP decision result 440 is "Match", if the SYN-ACK decision result 445 is a "Match", and further if the time limit TIME_LIMIT424-*m* specified by the table address 439 of the limit time table 424 is T3 or not (step 903). If these conditions are satisfied, then the state update unit 420 changes the Pass/Discard check results STATE426-*m* specified by the table address 439 of state table 426 to "Pass" (step 904). Then the Pass/Discard check results for both before and after the change, are output as the Pass/Discard check results 451.

The TCP header data 438 output by the TCP header extractor unit 402, the SIP-DIP match decision results 443 output by the SIP-DIP match checker 413, the DIP-SIP match decision results 447 output by the DIP-SIP match checker 414, the over-limit time check results 442 output by the time over-limit checker unit 416, and the TCP check results 440 output by the TCP discriminator unit 408, and the SYN-ACK decision result 445 output by the SYN-ACK discriminator unit 410; are input to the differential SEQ update unit 421.

The differential SEQ update unit 421 rewrites the differential SEQ table 427 specified as the value for use in converting the sequence number of packet judged as Pass.

Figure 12F:
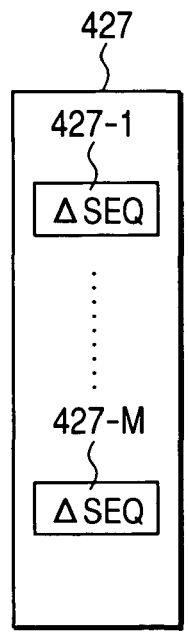
FIG. 12F is a drawing showing an example of the differential SEQ table of the embodiment of this invention.

FIG. 12F is a drawing showing an example of the differential SEQ table 427.

The differential SEQ table 427 includes M number of differential values ΔSEQ427-*m* (m=1 to M) for recording the value used for converting the sequence number of the packet decided to be a "Pass".

Figure 18:
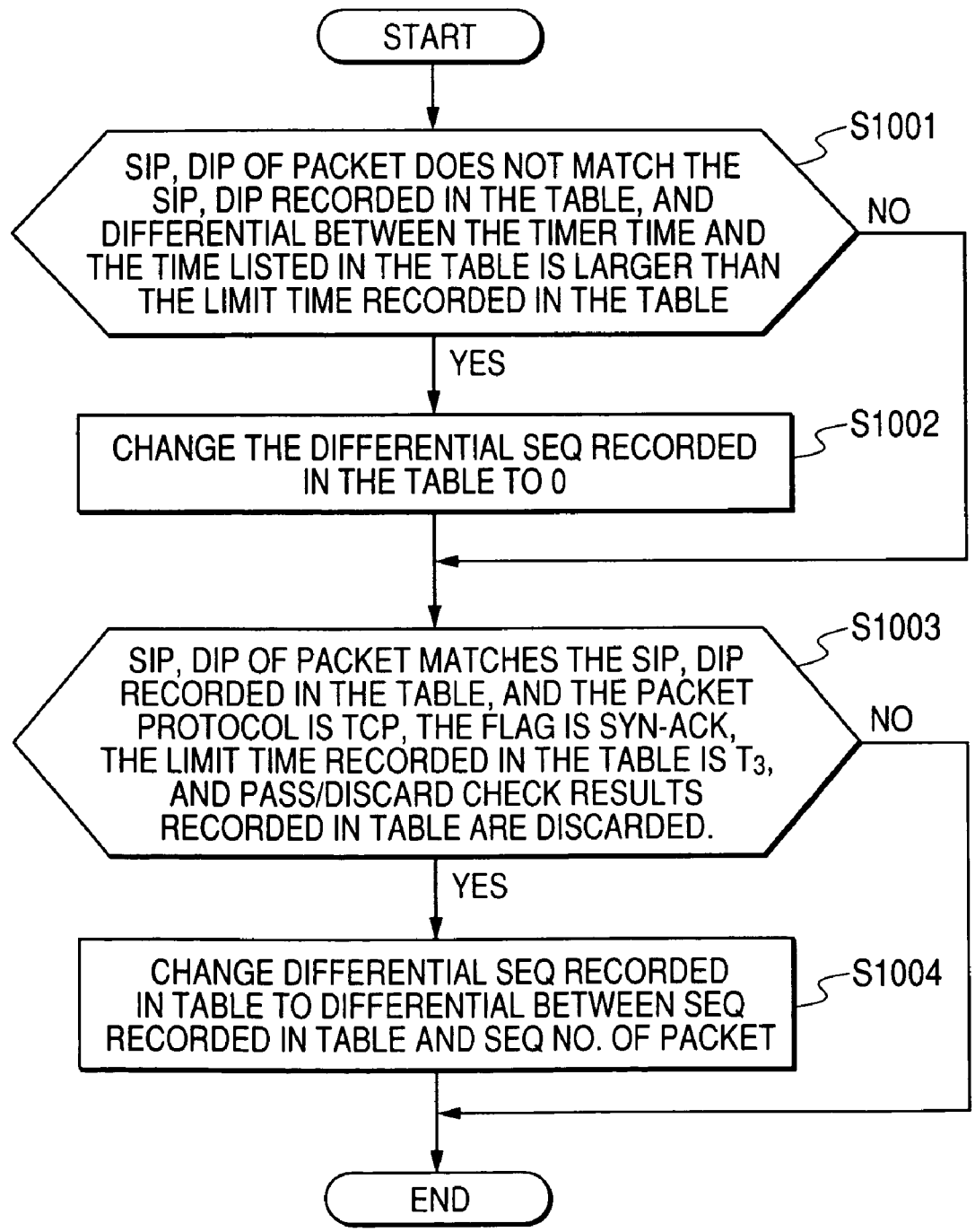
FIG. 18 is a flow chart showing the operation of the differential SEQ update unit of the embodiment of this invention.

FIG. 18 is a flow chart showing the operation of the differential SEQ update unit 4.

The differential SEQ update unit 421 decides if the received SIP-DIP match decision results 443 are a "Mismatch", and the received over-limit time check results 442 were exceeded or not, (step 1001). When the differential SEQ update unit 421 decides that the SIP-DIP match decision results 443 are a "Mismatch", and that the received over-limit time check results 442 were exceeded, it changes the differential values ΔSEQ427-*m* specified in the table address 439 of differential SEQ SEQ table 427 to 0 (step 1002) (process 463).

Next, the differential SEQ update unit 421 decides if the received DIP-SIP match decision results 447 are a "Match", and if the TCP check data 440 is a "Match", and if the SYN-ACK decision result 445 are a "Match", and further, if the time limit TIME_LIMIT424-*m* specified by the table address 439 of the limit time table 424 is T3, and still further decides if the Pass/Discard check results STATE426-*m* specified by the table address 439 of state table 426 are a "Discard" or not (step 1003). If these conditions are satisfied, then the differential SEQ update unit 421 changes the differential SEQ ΔSEQ427-*m* specified by the table address 439 of the differential SEQ table 427, to the differential value between the SEQ425-*m* specified by the table address 439, and the SEQ2212 contained in the TCP header data 438 (step 1004) (process 463).

The input packet data 430 output by the illegal communication detector unit 471, the limit time 449 output by the limit time update unit 417, the Pass/Discard check results 451 output by the state update unit 420, and the table address 439 output by the address generator unit 407; are input to the buffer accumulator unit 432.

The buffer accumulator unit 432 contains a buffer comprised of a memory, etc. The buffer accumulator unit 432 stores the input packet data 430 in a region specified by means of the table address 439 inside the buffer when the limit time 449 before the change and the limit time 449 after the change are both T3. In all other cases, the buffer accumulator unit 432 outputs the input packet data 430 as the packet data 431. The accumulated input packet data 430 loaded after the post-change Pass/Discard check results 451 were changed to pass, and output as the packet data 431. The format of this packet data 431 is the same as the input packet data 430.

The packet data 431 output by the buffer accumulator unit 432, the DIP-SIP match results 447 output by the DIP-SIP match checker 414, the TCP check data results 440 output by the TCP discriminator unit 408, the time limit TIME_LIMIT424-*m* specified by the table address 439 of limit time table 424, the Pass/Discard check results STATE426-*m* acquired by specifying by the table address 439 of state table 426, and the differential SEQ ΔSEQ427-*m* acquired by specifying by the table address 439 from the differential SEQ table 427; are input to the SEQ No. converter unit 403.

Figure 19:
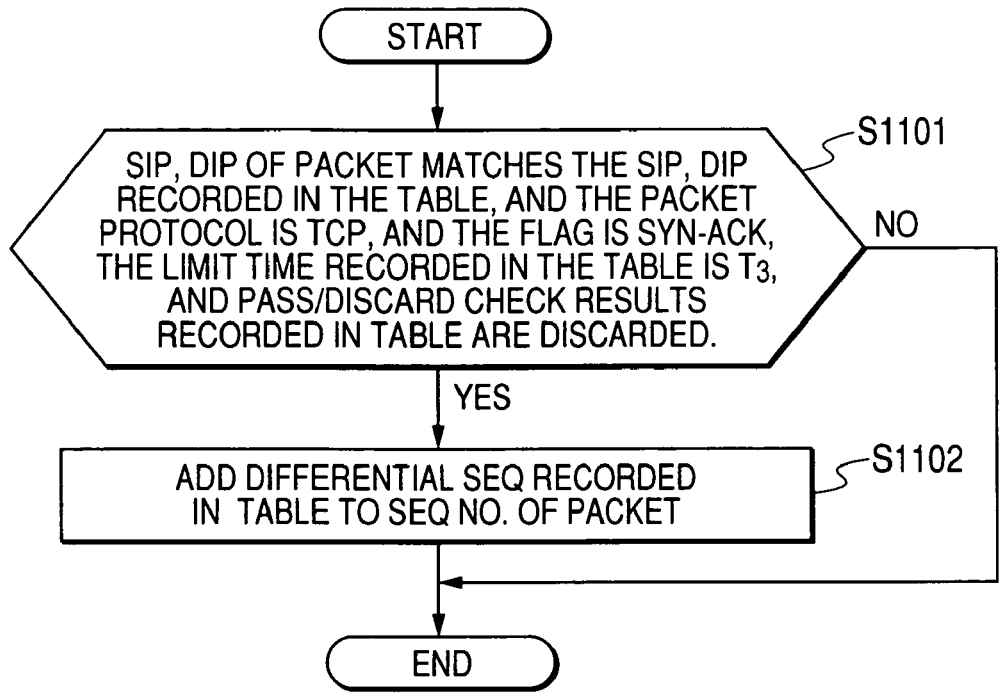
FIG. 19 is a flow chart showing the operation of the SEQ No. converter unit of the embodiment of this invention.

FIG. 19 is a flow chart of the operation of the SEQ No. converter unit 403.

The SEQ No. converter unit 403 decides if the received DIP-SIP match decision results 447 are a "Match", and the received TCP check data results 440 are a "Match", and further if the time limit TIME_LIMIT424-*m* is T3, and further decides whether the Pass/Discard check results STATE426-*m* are a "Pass" or not (step 1101). If these conditions are satisfied, then the SEQ No. converter unit 403 adds the differential SEQ ΔSEQ427-*m* to the SEQ2212 contained in the packet data 431 (step 1102). This processed packet data is output as the packet data 433. The format of this packet data 433 is the same as the input packet data 430.

The packet data 433 output by the SEQ No. converter unit 403, and the SIP-DIP match decision results 443 output by the SIP-DIP match checker 413, the TCP check data results 440 output by the TCP discriminator unit 408, the time limit TIME_LIMIT424-*m* acquired by specifying by the table address 439 from the limit table 424, the Pass/Discard check results STATE426-*m* acquired by specifying by the table address 439 of state table 426, and the differential SEQ ΔSEQ427-*m* acquired by specifying by the table address 439 of the differential SEQ table 427; are input to the ACK No. converter unit 404.

Figure 20:
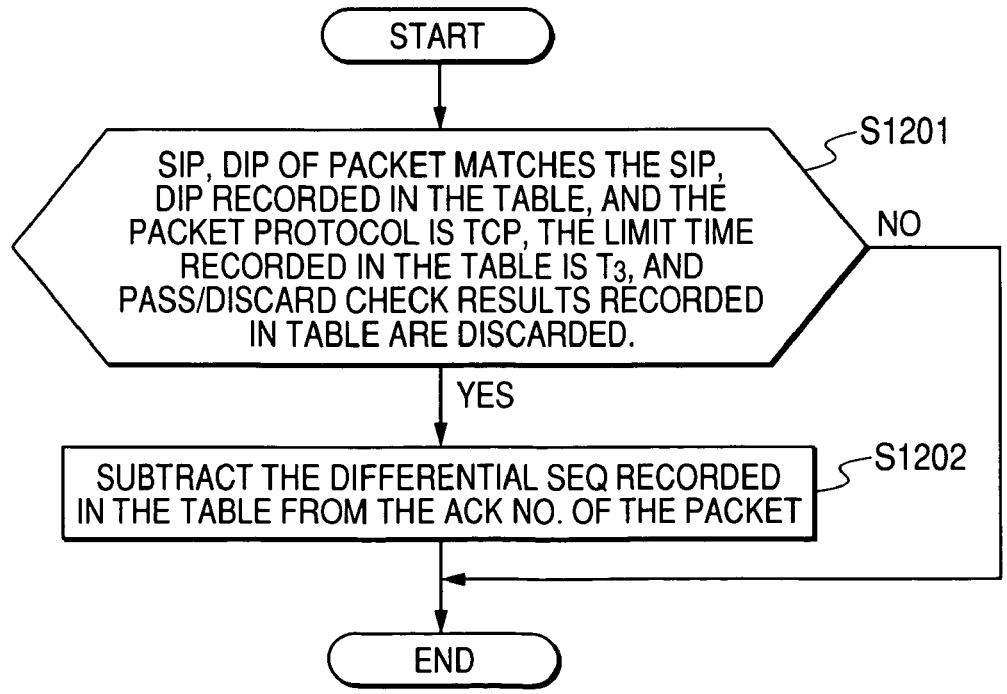
FIG. 20 is a flow chart showing the operation of the ACK No. converter unit of the embodiment of this invention.

FIG. 20 is a flow chart showing the operation of the ACK No. converter unit 404.

The ACK No. converter unit 404 decides if the received SIP-DIP match decision results 443 are a "Match", if the received TCP check data 440 is a "Match", if the received time limit TIME_LIMIT424-*m* is T3, and further if the received Pass/Discard check results STATE426-*m* are a "Pass" or not (step 1201). If these conditions are satisfied, then the ACK No. converter unit 404 subtracts the differential SEQ ΔSEQ427-*m* from the ACK2213 contained in the packet data 433 (step1202). This processed packet data is output as the packet data 434. The format of this packet data 434 is the same as the input packet data 430.

The packet data 434 output by the ACK No. converter unit 404, the limit time 449 output by the time update unit 415, and the Pass/Discard check results 451 output by the state update unit 420, and the random generated value 450 output by the SEQ No. update unit 418; are input to the packet update unit 405.

Figure 21:
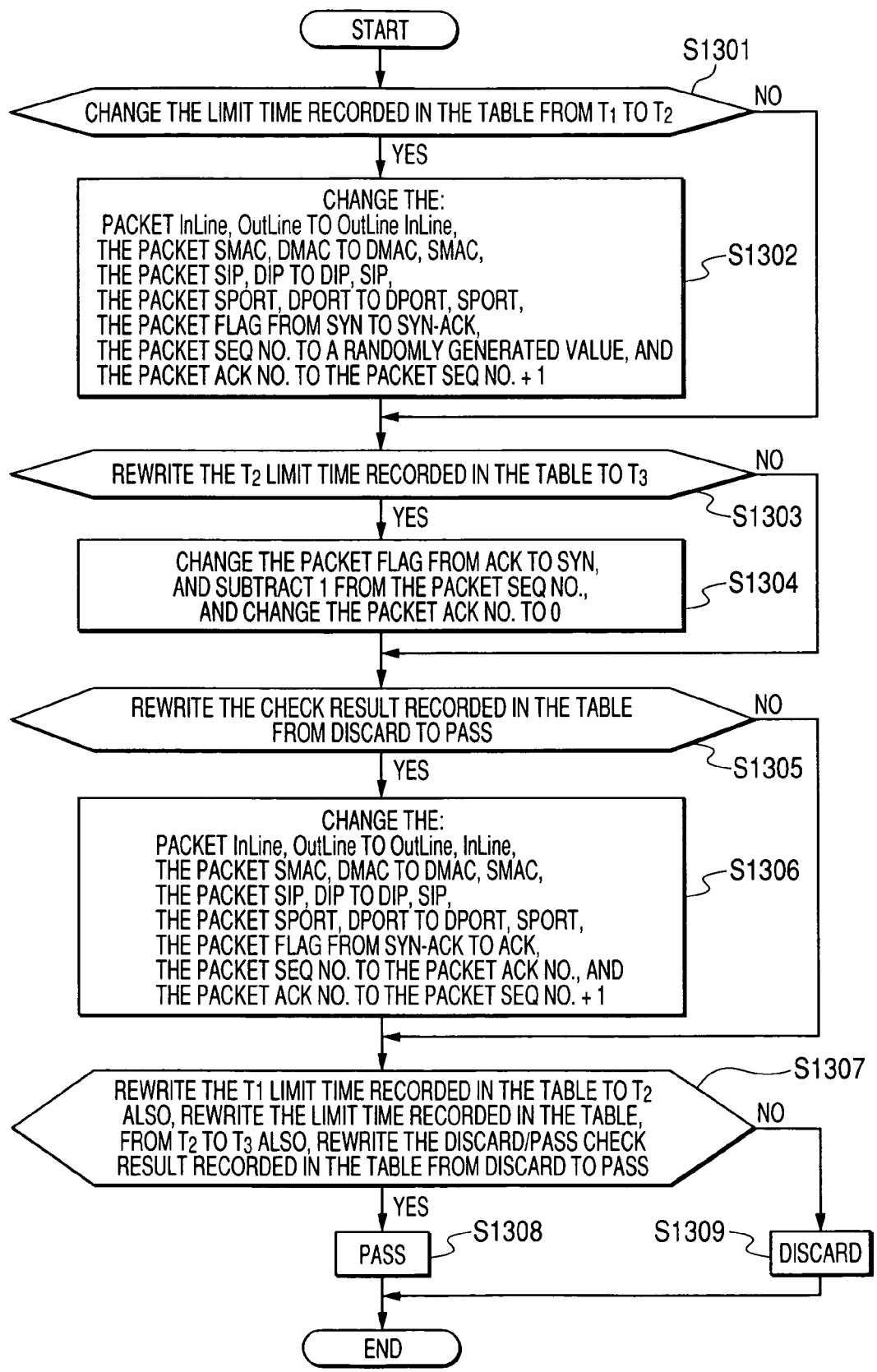
FIG. 21 is a flow chart showing the operation of the packet update unit of the embodiment of this invention.
Figure 22:
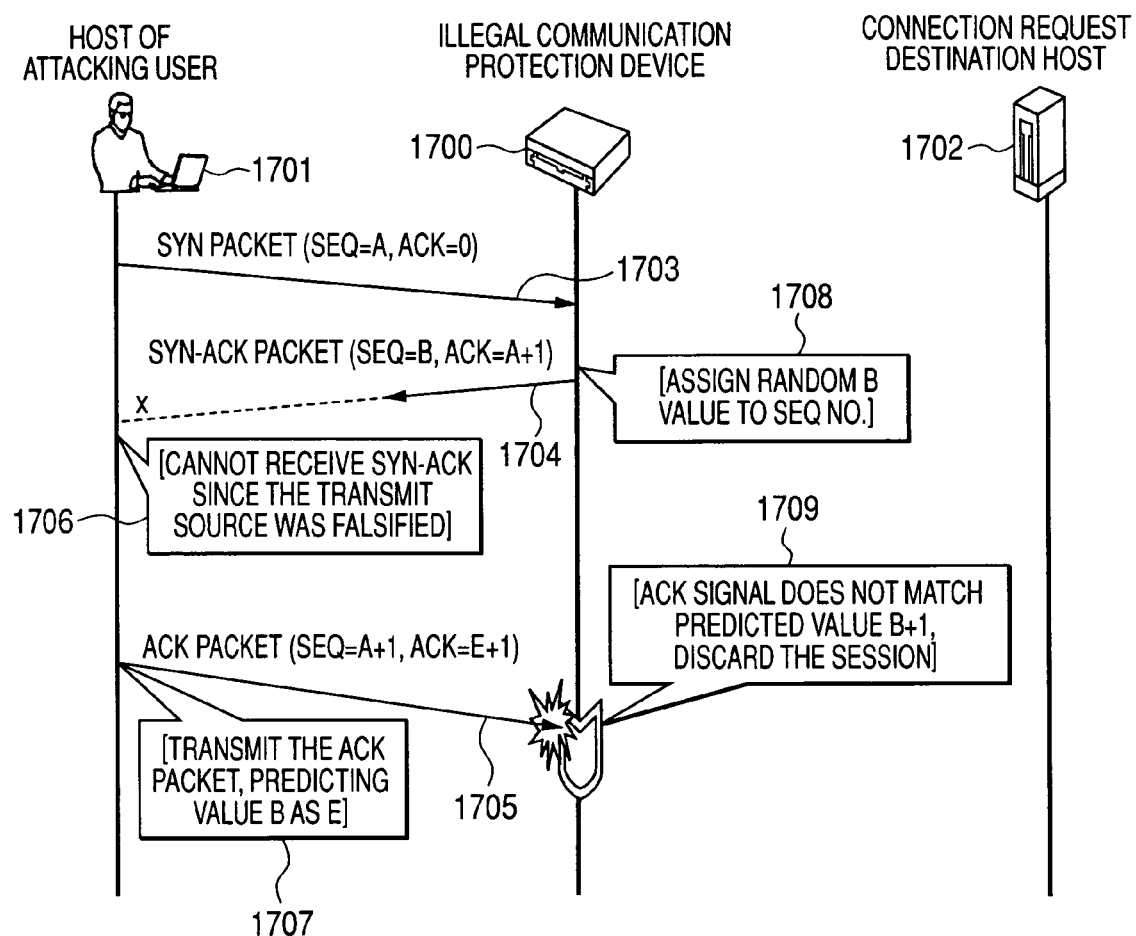
FIG. 22 is a sequence diagram for rejecting illegal communication by the illegal communication protection device of the embodiment of the related art.
Figure 23:
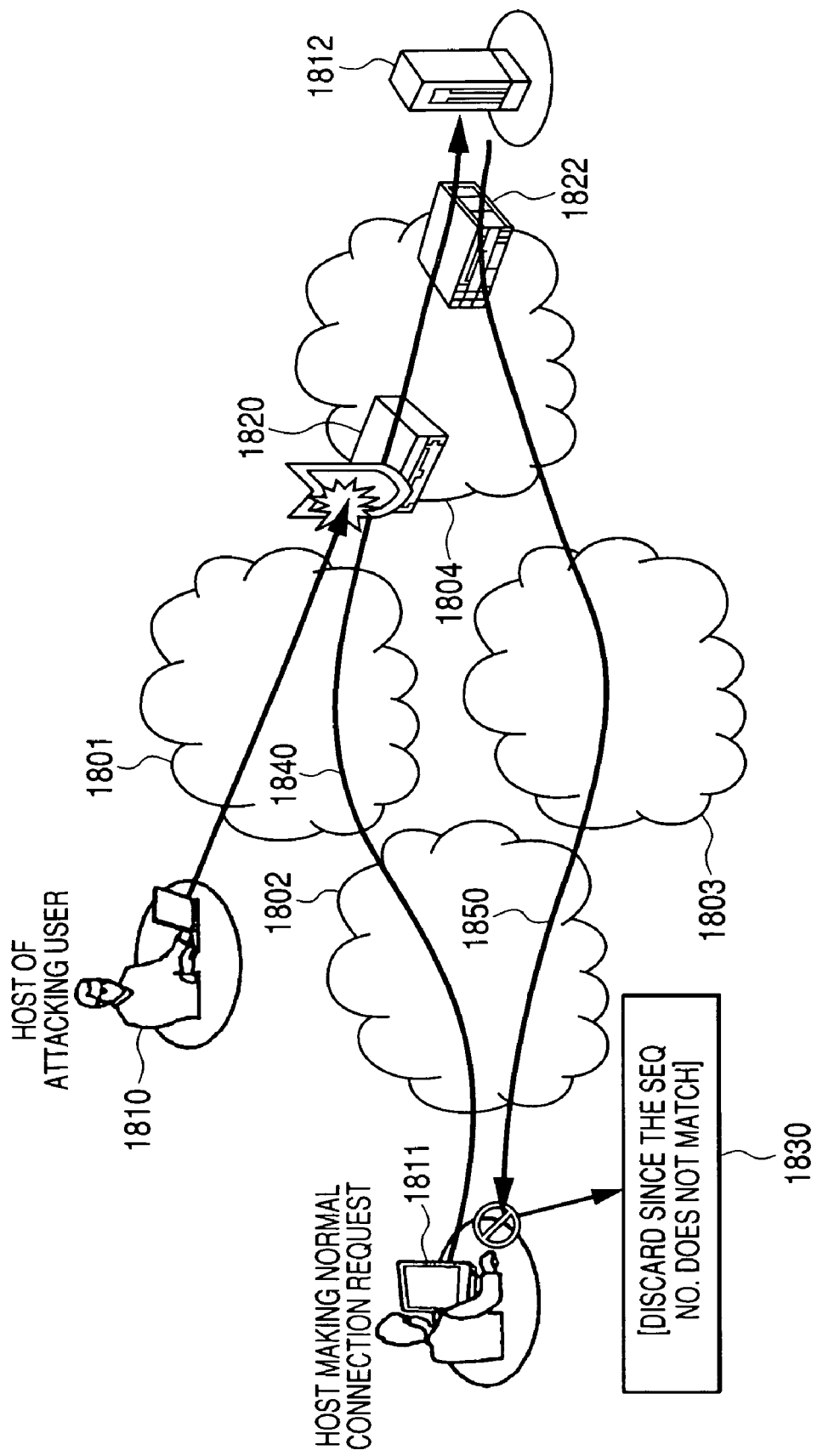
FIG. 23 is a drawing showing the case when there was a failure in protecting normal (legal) communications of the related art.
Figure 24:
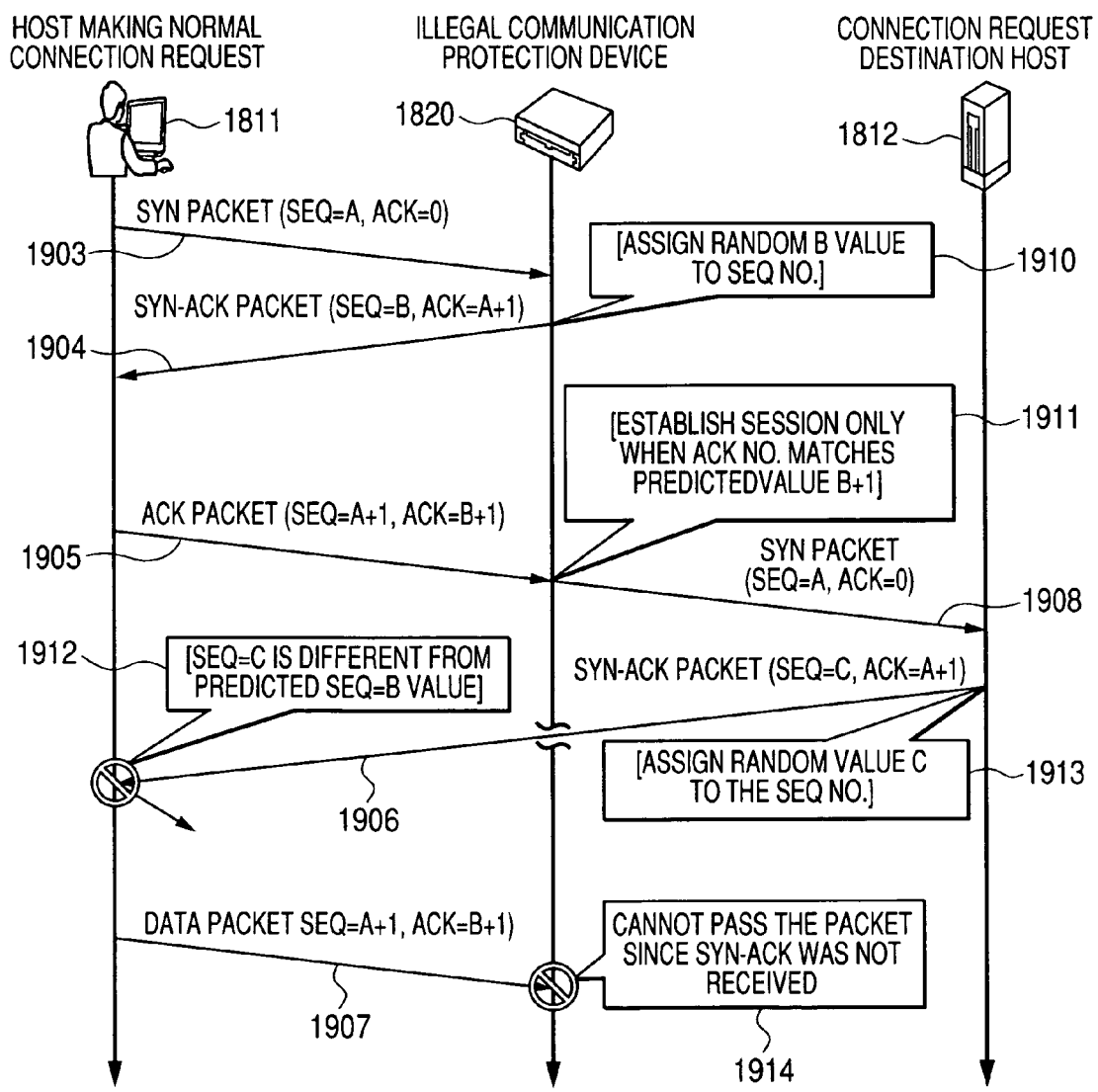
FIG. 24 is a sequence diagram showing the case when there was a failure in protecting normal (legal) communications of the related art.

FIG. 21 is a flow chart showing the operation of the packet update unit 405.

The packet update unit 405 decides if the limit time prior to the change included in the received limit time 449 is T1 or not, and decides if the limit time after the change is T2 or not (step 1301). If the limit time prior to the change included in the received limit time 449 is T1, and the limit time after the change is T2, then the value for InLine 2201 of packet data 434 and the value for OutLine 2202 are exchanged. The values for DMAC2204 and SMAC2203 of packet data 434 are also exchanged. The values for DIP2207 and SIP2206 of packet data 434 are also exchanged. The values for Dport2209 and Sport2208 of packet data 434 are also exchanged. The Flag2210 values in the packet data 434 are also changed from 2 to 18. In other words, the value from 2 indicating SYN is changed to a value 18 indicating SYN-ACK. Also, the SEQ2212 value in the packet data 434 is set in the random generated value 450. The ACK2213 value is changed to the SEQ2212 value added with a 1 (step 1302).

Next, the packet update unit 405 decides if the received limit time before the change included in the received limit time 449 is T2, and if the limit time after the change is T3 or not (step 1303). If the limit time before the change in the received limit time 449 is T2, and the limit time after the change is T3, then the packet update unit 405 changes the value for Flag2210 of packet data 434 from 16 to 2. In other words, the value is changed from 16 indicating ACK to 2 indicating SYN. A 1 is also subtracted from the SEQ2212. The value for ACK2213 is changed to 0 (step 1304).

Next, the packet update unit 405 decides if the Pass/Discard check results before the change included in the received Pass/Discard check results 451 are "Discard", and if the received Pass/Discard check results after the change are "Pass" or not (step 1305). If the Pass/Discard check results before the change included in the Pass/Discard check results 451 are "Discard", and the Pass/Discard check results after the change are "Pass", then the OutLine 2202 and InLine2201 values of the packet data 434 are exchanged. The values for DMAC2204 and SMAC2203 of packet data 434 are also exchanged. The values for DIP2207 and SIP2206 of packet data 434 are also exchanged. The values for Dport2209 and Sport2208 of packet data 434 are also exchanged. The Flag2210 values in the packet data 434 are also changed from 18 to 16. In other words, the value is changed from 18 indicating SYN-ACK to 16 indicating ACK. The value for SEQ2212 is changed to ACK2213. The ACK2213 value is changed to the SEQ2212 value added with a 1 (step 1306).

The packet update unit 405 next decides if the limit time before the change included in the received limit time 449 is T1, and if the limit time after the change is T2 or not; or if the limit time before the change included in the limit time 449 is T2, and if the limit time after the change is T3 or not; or if the Pass/Discard check results after the change included in the received Pass/Discard check results 451 are "Pass" or not (step 1307). If even one among these conditions are satisfied then the packet update unit 405 outputs the packet data 434 as the packet data 435 (step 1308). On the other hand, if these conditions are not satisfied then the packet data 434 is discarded (step 1309). The format of this packet data 435 is the same as the input packet data 430.

The packet data 435 output by the packet update unit 405, the TCP decision result 440 output by the TCP discriminator unit 408, the limit time 449 output by the limit time update unit 417, the Pass/Discard check results 451 output by the state update unit 420, the SIP-DIP match decision results 443 output by the SIP-DIP match checker 413, and the DIP-SIP match decision results 447 output by the DIP-SIP match checker 414; are input to the checksum update unit 406.

The checksum update unit 406 decides if the limit time before the change included in the received limit time 449 is T1, and if the limit time after the change is T2 or not; or if the limit time before the change included in the received limit time 449 is T2, and if the limit time after the change is T3 or not; or if the Pass/Discard check results after the change included in the received Pass/Discard check results 451 are "Pass" or not, also if the if the received TCP check data 440 is a "Match", and if either of the SIP-DIP match decision results 443 or DIP-SIP match decision results 447 are a "Match" or not. If these conditions are satisfied, then the checksum update unit 406 recalculates the TCP checksum ChK-Sum2211 of the packet data 435. The processed packet data that stores this new checksum is output as the packet data 436.

The processing described above by the illegal communication protection unit 400 of the embodiment of this invention in this way minimizes the probability of an error when safeguarding legal (genuine) communications with a large RTT, even when illegal communications are generated on a large scale.

What is claimed is:

1. A communication device connected to a network, comprising:
   a plurality of lines;
   a storage unit containing a first routing table for applying connection oriented communication packets and a second routing table for applying packets other than connection oriented communication packets, the first routing table registering addresses in association with corresponding lines of the plurality of lines based on a routing protocol; and
   a control unit that includes a type detector unit for identifying a type of protocol of each received packet and an attachment information detector unit for identifying a type of flag attached to each received packet,
   wherein the control unit:
   determines whether each received packet is related to a connection request,
   upon a first packet received via any of the plurality of lines being determined to be related to a connection request, stores, in the second routing table, a transmit source IP address of the first packet as an address associated with the line from which the first packet was inputted, specifies a line for transmitting based on the first routing table and the routing protocol, and transmits the first packet for sending to a destination IP address of the first packet via the specified line, and
   upon a second packet received via any of the plurality of lines being determined to not be related to a connection request, checks the transmit source IP address of the first packet stored in the second routing table, acquires an acquired line associated with an address matching a destination IP address of the second packet based on the first routing table, and, if the destination IP address of the second packet corresponds to the transmit source IP address of the first packet in the second routing table, transmits the second packet via the line from which the first packet was inputted, and wherein
   the first packet is an SYN packet,
   when the first packet is sent, the storage unit stores routing type register information that contains information for setting whether to use either the first routing table or the second routing table,
   the control unit contains a routing discriminator unit for checking the routing type register information, and deciding at least one of the first and second routing tables to use for transferring a received packet,
   upon the routing discriminator unit deciding to use the second routing table in transferring the received packet, and the attachment information detector unit identifying the flag attached to the received packet as SYN, then the control unit stores in the second routing table the transmit source IP address of the packet associated with the line from which the received packet was inputted, obtains the line associated with the destination IP address based on the first routing table, and transmits the received packet via the obtained line, and
   upon the routing discriminator unit deciding to use the second routing table for transferring the received packet, and the attachment information detector unit identifying the flag attached to the received packet as not SYN, then the control unit acquires the line associated with the destination IP address matching the destination IP address of the received packet from the second routing table, and sends the received packet via the acquired line, and
   upon the routing discriminator unit deciding to use the first routing table for transferring the received packet, or the protocol of the received packet is not TCP protocol, then the control unit acquires the line linking the destination IP address of the packet with the matching packet address from the first routing table, and sends the received packet via the acquired line.

2. A communication device according to claim 1, wherein when the type detector unit identifies the protocol of a received packet as a TCP protocol, and the attachment information detector unit identifies the flag attached to the received packet as SYN, then the control unit stores in the second routing table a transmit source IP address of the received packet associated with the line wherefrom which the received packet was inputted, and
when the type detector unit identifies the protocol of a received packet as a TCP protocol, and the attachment information detector unit identifies the flag attached to the packet as other than SYN, the control unit checks the second routing table, acquires a line associated with a destination IP address matching the destination IP address of the packet and sends the packet via the acquired line.

3. A network system, comprising:

a communication device, including a number of lines, a storage unit containing a first routing table for applying connection oriented communication packets and a second routing table for applying packets other than connection oriented communication packets, and a control unit which:

determines whether each received packet is related to a connection request, upon a first packet received via any of the plurality of lines being determined to be related to a connection request, stores, in the second routing table, a transmit source IP address of the first packet as an address associated with the line from which the first packet was inputted, specifies a line for transmitting based on the first routing table and a routing protocol, and transmits the first packet for sending to a destination IP address of the first packet via the specified line, and upon a second packet received via any of the plurality of lines being determined to not be related to a connection request, checks the transmit source IP address of the first packet stored in the second routing table, acquires an line associated with an address matching a destination IP address of the second packet based on the first routing table, and, if the destination IP address of the second packet corresponds to the transmit source IP address of the first packet in the second routing table, transmits the second packet, via the line from which the first packet was inputted; and an illegal communication protection device, including at least one line, a second control unit which receives packets, transmits the packets which are not decided as illegal and restricts transmission of the packets which are decided as illegal, and a second storage unit which contains session information that includes a SIP-DIP table of a source IP address and a destination IP address, which is renewed by a connection request packet, a last arrival time of a packet associated with a matched combination of IP addresses in the SIP-DIP table, and a time threshold associated with a matched combination of IP addresses in the SIP-DIP table;

wherein, when a packet is arrived and a difference between current time and the last arrival time exceeds the time threshold in the session information, that the arrived packet belongs to, the control unit permits to renew the session information; and wherein, the time threshold is changed based on at least one selected from the group including a source IP address of the packet, a destination IP address of the packet, and a difference between the current time and the last arrival time in the session information.

\* \* \* \* \*